United States Patent
Ochi et al.

(10) Patent No.: US 8,934,187 B2
(45) Date of Patent: Jan. 13, 2015

(54) MAGNETIC TAPE DEVICE AND METHOD FOR CONTROLLING MOVEMENT OF MAGNETIC HEAD

(71) Applicant: Fujitsu Limited, Kawasaki-shi (JP)

(72) Inventors: Yoshiaki Ochi, Kawasaki (JP); Koujiro Hashimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 147 days.

(21) Appl. No.: 13/661,848

(22) Filed: Oct. 26, 2012

(65) Prior Publication Data

US 2013/0148235 A1 Jun. 13, 2013

(30) Foreign Application Priority Data

Dec. 12, 2011 (JP) ................................ 2011-271283

(51) Int. Cl.
*G11B 5/54* (2006.01)

(52) U.S. Cl.
USPC ...................... 360/55; 360/130.32; 360/241.2; 360/241.3; 360/251; 360/75

(58) Field of Classification Search
None
See application file for complete search history.

(56) References Cited

U.S. PATENT DOCUMENTS

| | | | |
|---|---|---|---|
| 3,169,720 A * | 2/1965 | Proctor ......................... | 360/251 |
| 3,185,484 A * | 5/1965 | Burdeno ....................... | 360/251 |
| 3,333,065 A * | 7/1967 | Torok ............................ | 360/251 |
| 5,293,285 A * | 3/1994 | Leonhardt et al. ............. | 360/95 |
| 5,430,586 A * | 7/1995 | Koo ............................... | 360/95 |
| 6,535,349 B1 * | 3/2003 | Collins ........................ | 360/96.3 |
| 6,856,488 B2 * | 2/2005 | King et al. .................... | 360/251 |
| 7,173,794 B2 * | 2/2007 | Molstad et al. ............... | 360/251 |
| 7,265,924 B2 * | 9/2007 | Shirouzu ........................ | 360/75 |
| 8,027,122 B2 * | 9/2011 | Vanderheyden et al. .. | 360/241.2 |

FOREIGN PATENT DOCUMENTS

| | | |
|---|---|---|
| JP | U6-36491 | 5/1994 |
| JP | 7-65455 A | 3/1995 |
| JP | 10-162545 A | 6/1998 |
| JP | 2005-166094 | 6/2005 |
| JP | 2005-251323 | 9/2005 |

OTHER PUBLICATIONS

Korean Office Action mailed Dec. 6, 2013 for Korean Application No. 10-2012-132789, with Partial English-language Translation.

* cited by examiner

*Primary Examiner* — Wayne Young
*Assistant Examiner* — James L Habermehl
(74) *Attorney, Agent, or Firm* — Fujitsu Patent Center

(57) ABSTRACT

A magnetic head is arranged between two reels around which a magnetic tape is wound and contacts one side of the magnetic tape spanned between the two reels. A driver moves the magnetic head. A controller causes the driver to generate a driving force for pressing the magnetic head against the one side of the magnetic tape while keeping the magnetic head in contact with the magnetic tape. It is possible to cause the magnetic head to stably contact the magnetic tape even when the running position of the magnetic tape varies in accordance with the winding state of the magnetic tape around the reel.

6 Claims, 18 Drawing Sheets

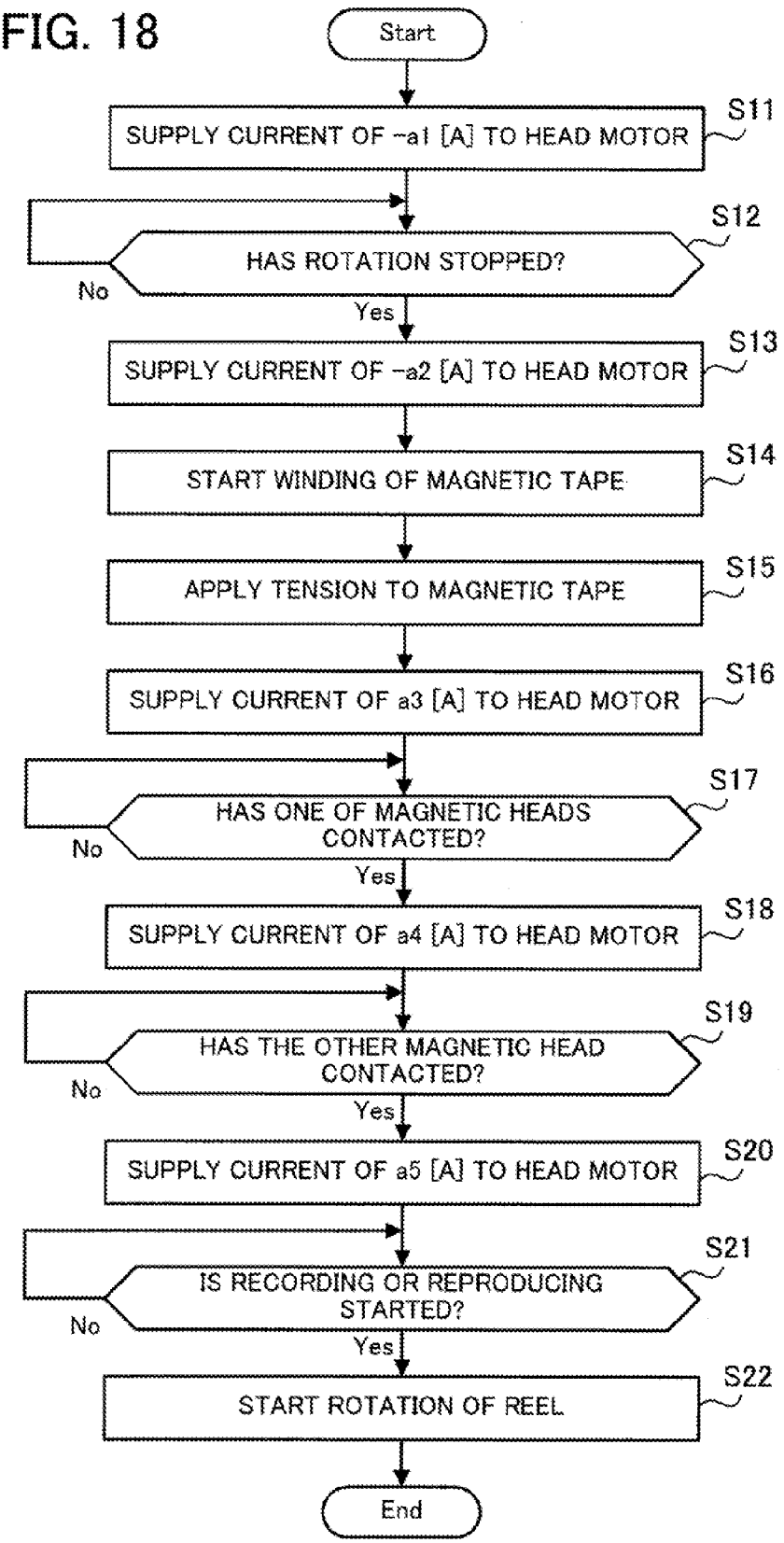

MAGNETIC TAPE DEVICE AND METHOD FOR CONTROLLING MOVEMENT OF MAGNETIC HEAD

CROSS-REFERENCE TO RELATED APPLICATION

This application is based upon and claims the benefit of priority of the prior Japanese Patent Application No. 2011-271283, filed on Dec. 12, 2011, the entire contents of which are incorporated herein by reference.

FIELD

The embodiments discussed herein relate to a magnetic tape device and a method for controlling movement of a magnetic head.

BACKGROUND

The magnetic tape is widely used as a recording medium capable of recording a large amount of data. The magnetic tape device writes and reads a signal by causing a magnetic head to contact a magnetic tape running between two reels while winding the magnetic tape wound around one of the two reels around the other reel.

In general, a guide roller is arranged on the running path of the magnetic tape from one of the reels to the other reel in many cases. One of the roles of the guide roller is to guide the magnetic tape so as to pass through a predetermined position. For example, by arranging a magnetic head in the region between two guide rollers, it is possible to cause a magnetic tape to stably contact the magnetic head. As an example of a magnetic tape device with such a configuration, there is one that enables double-sided recording by arranging two magnetic heads that contact the front side and back side of a magnetic tape respectively in the region between two guide rollers.

On the other hand, there is also proposed a magnetic tape device that records and reproduces data in the state where a magnetic tape is spanned directly from one of reels to the other reel without using a guide roller. A configuration that uses no guide roller simplifies the path structure of the magnetic tape, thus providing advantages of being able to reduce the manufacturing costs of the magnetic tape device and tape cartridge and to downsize the magnetic tape device. Further, by sliding along the guide roller, it is possible to relieve the burden imposed on the magnetic tape. (For example, see Japanese Laid-open Patent Publication No. 2005-166094 and Japanese Laid-open Patent Publication No. 2005-251323.)

However, when a configuration is used that directly spans the magnetic tape from one of reels to the other reel without using a guide rail, the position through which the magnetic tape passes varies in the tape thickness direction in accordance with the winding state of the magnetic tape around the reel. Due to such position variation of the magnetic tape, the pressure when the magnetic tape contacts the magnetic head is not constant and there is a case where the magnetic head detaches from the magnetic tape depending on the fixed position of the magnetic head.

SUMMARY

According to an aspect, a magnetic tape device includes a magnetic head arranged between two reels around which a magnetic tape is wound and configured to contact one side of the magnetic tape spanned between the two reels, a driver configured to move the magnetic head, and a controller configured to cause the driver to generate a driving force for pressing the magnetic head against the one side of the magnetic tape while keeping the magnetic head in contact with the magnetic tape.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a flowchart illustrating an example of a processing procedure in the magnetic tape device.

DESCRIPTION OF EMBODIMENTS

Figure 1:
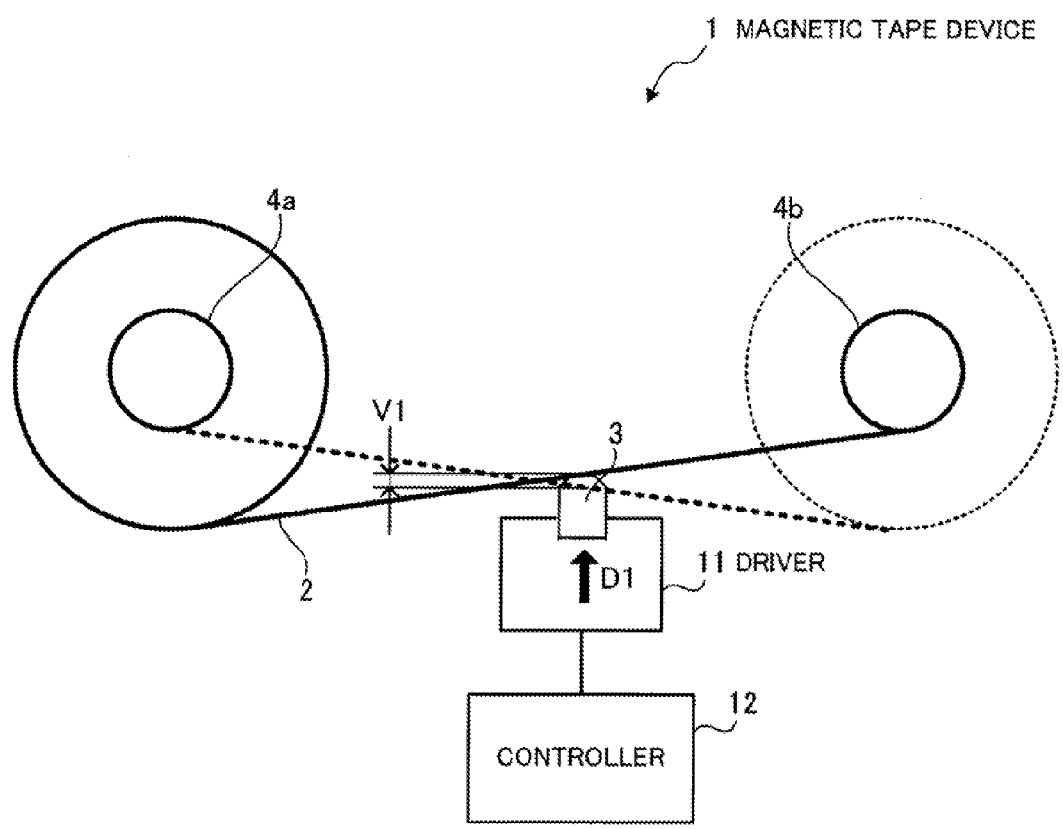
FIG. 1 illustrates a configuration example of a magnetic tape device according to a first embodiment.

Several embodiments will be described below with reference to the accompanying drawings, wherein like reference numerals refer to like elements throughout.

First Embodiment

FIG. 1 illustrates a configuration example of a magnetic tape device according to a first embodiment.

A magnetic tape device 1 includes a magnetic head 3 configured to contact one side of a magnetic tape 2 and to perform at least one of writing a signal to the magnetic tape 2 and reading a signal from the magnetic tape 2. The magnetic head 3 is arranged between two reels 4a and 4b around which the magnetic tape 2 is wound. FIG. 1 illustrates a running path of the magnetic tape 2 when viewed in the tape width direction and the magnetic tape device 1 is configured so that the magnetic head 3 contacts the under side of the magnetic tape 2 running substantially in the horizontal direction in FIG. 1.

At least one of the reels 4a and 4b may be accommodated in a tape cartridge. When the reel is accommodated in the tape cartridge, the tape cartridge is attached to the magnetic tape device 1 and in this state, the reel within the tape cartridge is rotationally driven by a reel motor (not illustrated) included in the magnetic tape device 1.

The magnetic tape 2 is spanned directly between the reel 4a and the reel 4b and on the running path of the magnetic tape 2 between the reel 4a and the reel 4b, nothing contacts the magnetic tape 2 except the magnetic head 3 and no guide roller is provided. Such a configuration simplifies a path structure of the magnetic tape 2, thus providing advantages of being able to reduce the manufacturing costs of the magnetic tape device 1 and tape cartridge and to downsize the magnetic tape device 1. By sliding along the guide roller, it is possible to relieve the burden imposed on the magnetic tape 2 and to improve the durability of the magnetic tape 2.

Further, for example, when using a tape cartridge in which only one of the reels 4a and 4b is accommodated, a process is necessary to pull the magnetic tape 2 out of the tape cartridge and wind it around the reel on the magnetic tape device 1 side. When using such a tape cartridge, a configuration that does not use a guide roller and simplifies the path structure of the magnetic tape 2 as in the present embodiment makes it possible to facilitate the winding process of the magnetic tape 2.

When the magnetic tape 2 is spanned directly between the reel 4a and the reel 4b, there is a case where the running position of the magnetic tape 2 in the tape thickness direction (in the vertical direction in FIG. 1) varies in accordance with the winding state of the magnetic tape 2 around the reels 4a and 4b. For example, a thick dotted line illustrated in FIG. 1 indicates the running position of the magnetic tape 2 in the state where most of the magnetic tape 2 is wound around the reel 4b. The position where the magnetic head 3 contacts the magnetic tape 2 varies in the vertical direction by an amount of variation V1 in FIG. 1 between the state where most of the magnetic tape 2 is wound around the reel 4a and the state where most of the magnetic tape 2 is wound around the reel 4b. The amount of variation of the running position increases as the position becomes more distant from the center position between the centers of rotation of the reels 4a and 4b on the magnetic tape 2.

When the running position of the magnetic tape varies as described above, the pressure when the magnetic tape 2 contacts the magnetic head 3 varies considerably and there is a possibility that the operation of recording and reproducing a signal becomes unstable. Further, there is a case where the magnetic head 3 is detached from the magnetic tape 2 depending on the position of the magnetic head 3.

In contrast to this, in the magnetic tape device 1, the operation of recording and reproducing a signal is stabilized by applying a driving force for pressing the magnetic head 3 against the magnetic tape 2 to the magnetic head 3 while keeping the magnetic head 3 in contact with the magnetic tape 2. As a configuration to stabilize the operation, the magnetic tape device 1 includes a driver 11 configured to move the magnetic head and a controller 12 configured to control the driving operation of the driver 11.

The driver 11 generates at least a driving force to move the magnetic head 3 in the direction in which the magnetic head 3 is pressed against one side of the magnetic tape 2. In the example of FIG. 1, the magnetic head 3 is made movable in the direction from the upper side to the under side of the magnetic tape 2 in FIG. 1 and in the opposite direction. Then, as in the example of FIG. 1, when the magnetic head 3 contacts the under side of the magnetic tape 2, the driver 11 generates at least a driving force to move the magnetic head 3 in the direction toward the upper side of the magnetic tape 2. In FIG. 1, as an example, it is assumed that the driver 11 generates a driving force to move the magnetic head 3 in the upward direction (D1 direction) in FIG. 1.

Note that, the shape of the driver 11 illustrated in FIG. 1 is merely an example and the driver 11 is able to be realized by an arbitrary outer shape and an internal configuration capable of generating the driving force as described above.

The controller 12 causes the driver 11 to keep generating a driving force for pressing the magnetic head against the under side of the magnetic tape 2 while keeping the magnetic head 3 in contact with under side of the magnetic tape 2. The driving force that the driver 11 is caused to generate while the magnetic head 3 is in contact with the under side of the magnetic tape 2 is a driving force with which the magnetic head 3 remains still in the D1 direction with the state being kept where the magnetic head 3 is pressed against the under side of the magnetic tape 2 with a pressure not less than a predetermined value. In this state, the driving force in the D1 direction by the driver 11 and the reaction force by the tension of the magnetic tape 2 are balanced.

Note that, the driving force that the driver 11 is caused to generate while the magnetic head 3 is in contact with the under side of the magnetic tape 2 may be, for example, a constant driving force. Alternatively, the controller 12 may determine the winding state of the magnetic tape 2 around the reel based on the positional information read from the magnetic tape 2 and cause the driver 11 to generate a driving force with which the magnetic head 3 is pressed against the magnetic tape 2 with a constant pressure in accordance with the determination result.

The driving force as described above is generated by the driver 11 while the magnetic head 3 is in contact with the under side of the magnetic tape 2, and thereby the position of the magnetic head 3 in the vertical direction in FIG. 1 changes as follows. When the position of the portion of the magnetic tape 2 where the magnetic tape 2 is in contact with the magnetic head 3 varies in the vertical direction in FIG. 1, the magnetic head 3 moves in the vertical direction in FIG. 1 accompanying the variation of the magnetic tape 2 with the state being kept where the magnetic head 3 presses the magnetic tape 2 with a pressure not less than a predetermined value by the driving force from the driver 11. In the example in FIG. 1, as the magnetic tape 2 is wound around the reel 4b, the magnetic head 3 moves in a downward direction accompanying the variation of the magnetic tape 2 in the same downward direction in FIG. 1.

Due to this, the amount of variation of the pressure of the magnetic head 3 against the magnetic tape 2 accompanying the variation of the running position of the magnetic tape 2 is suppressed and the magnetic head 3 is able to be in contact with the magnetic tape 2 stably. Consequently, it is possible to stabilize the operation of recording or reproducing a signal.

Further, it is possible to increase the degree of freedom of the position where the magnetic head 3 contacts the magnetic tape 2. In particular, when a tape cartridge is used in which only one of the reels is accommodated, the outer case of the tape cartridge is attached to the magnetic tape device 1. Because of this, when an attempt is made to downsize the magnetic tape device 1, there occur restrictions on the arrangement of the magnetic head depending on the position where the outer case of the tape cartridge is attached and the possibility is increased that it is no longer possible to arrange the magnetic head in a position equidistant from the rotation axes of the two reels. By causing the magnetic head 3 to contact the magnetic tape 2 using the driver 11 and the controller 12 as in the present embodiment, it is possible to stabilize the operation of recording or reproducing a signal even when using the tape cartridge in which only one of the reels is accommodated as described above.

Next, a modified example in which part of the above-mentioned first embodiment is modified is explained.

Figure 2:
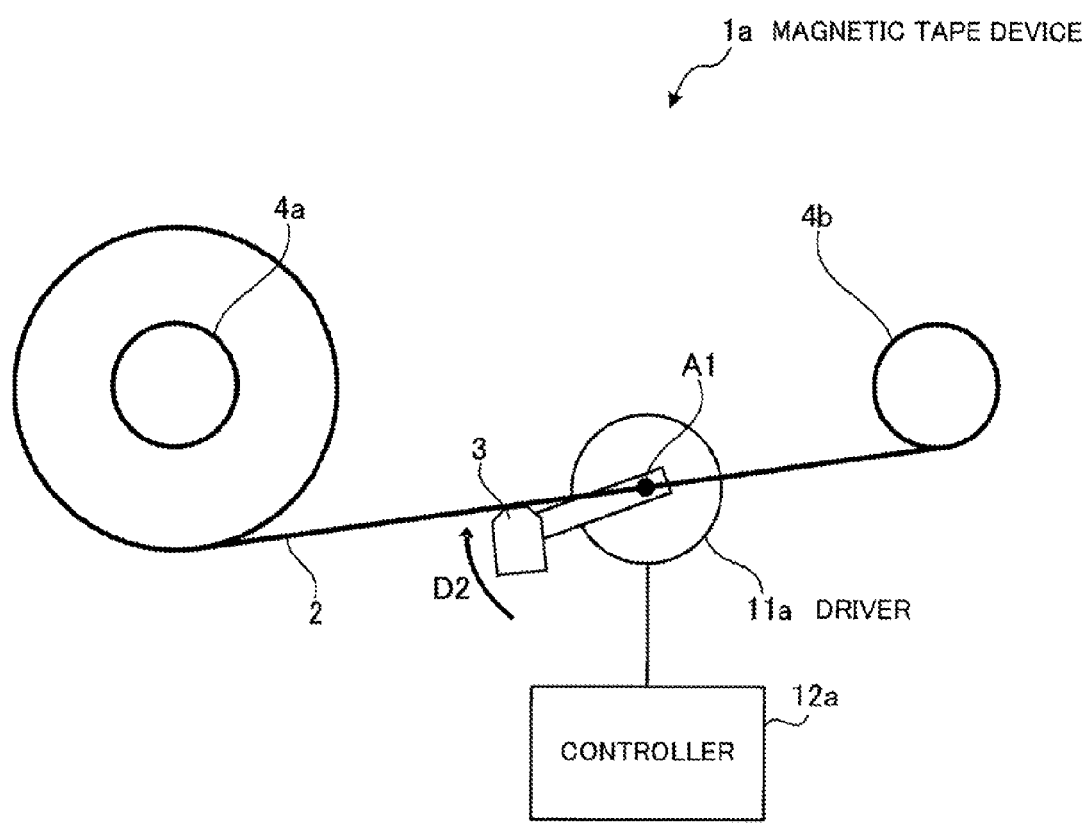
FIG. 2 illustrates a first modified example of the first embodiment.

FIG. 2 illustrates a first modified example of the first embodiment. Note that, in FIG. 2, components corresponding to those in FIG. 1 are illustrated with the same symbols attached.

A magnetic tape device 1a illustrated in FIG. 2 has a configuration in which the magnetic head 3 in the magnetic tape device 1 illustrated in FIG. 1 is enabled to rotate about a rotation axis A1 parallel to the side of the magnetic tape 2 and perpendicular to the running direction of the magnetic tape 2. The magnetic tape device 1a includes a driver 11a configured to rotationally drive the magnetic head 3 about the rotation axis A1 and a controller 12a configured to control the rotational driving operation by the driver 11a.

In the example of FIG. 2, as in FIG. 1, the magnetic head 3 contacts the under side of the magnetic tape 2. The driver 11a causes the magnetic head 3 to contact the under side of the magnetic tape 2 by rotating the magnetic head 3 in the clockwise direction (D2 direction) in FIG. 2. Note that, the shape of the driver 11a illustrated in FIG. 2 is merely an example and it is possible to realize the driver 11a with an arbitrary outer shape and an internal configuration capable of generating the driving force as described above.

The controller 12a causes the driver 11a to keep generating the rotational driving force in the D2 direction for pressing the magnetic head 3 against the under side of the magnetic tape 2 while keeping the magnetic head 3 in contact with the under side of the magnetic tape 2. The driving force that the driver 11a is caused to generate while the magnetic head 3 is in contact with the under side of the magnetic tape 2 is a driving force with which the magnetic head 3 remains still in the D2 direction with the state being kept where the magnetic head 3 is pressed against the under side of the magnetic tape 2 with a pressure not less than a predetermined value. In this state, the driving force in the D2 direction by the driver 11a and the reaction force in the opposite direction of D2 by the tension of the magnetic tape 2 are balanced.

The above-mentioned rotational driving force is generated from the driver 11a while the magnetic head 3 is in contact with the under side of the magnetic tape 2, and thereby the magnetic head 3 is able to be pressed against the magnetic tape 2 with a pressure not less than a predetermined value even when the position of the portion of the magnetic tape 2 where the magnetic head 3 contacts the magnetic tape 2 varies in the vertical direction in FIG. 2 accompanying the running of the magnetic tape 2. Consequently, it is possible to suppress the amount of variation of pressure of the magnetic head 3 against the magnetic tape 2 accompanying the variation of the running position of the magnetic tape 2, and therefore, it is possible to stabilize the operation of recording or reproducing a signal.

In the configuration in which the magnetic tape 2 is spanned directly between the reel 4a and the reel 4b as in the magnetic tape device 1a, the angle of the running path of the magnetic tape 2 varies in accordance with the winding state of the magnetic tape 2 around the reel. As in FIG. 2, when the reels 4a and 4b are arranged in the horizontal direction, as the magnetic tape 2 is wound from the reel 4a around the reel 4b, the angle of the running path of the magnetic tape 2 between the reel 4a and the reel 4b changes from the left-inclined state to the right-inclined state.

Here, as in the example of FIG. 1, when the magnetic head 3 is movable in the vertical direction, the head surface angle of the magnetic head 3 is constant at all times. Because of this, if the winding state of the magnetic tape 2 around the reel changes and the angle of the running path of the magnetic tape 2 varies, the contact angle between the magnetic tape 2 and the magnetic head 3 changes as a result and this may be a factor to make the operation of recording or reproducing a signal unstable.

In contrast to this, by rotating the magnetic head 3 about the rotation axis A1 as illustrated in FIG. 2, it is possible to cause the contact angle of the magnetic head 3 relative to the magnetic tape 2 to follow the angular variation of the running path of the magnetic tape to a certain degree. For example, in FIG. 2, as the magnetic tape 2 is wound around the reel 4b, the angle of the running path of the magnetic tape 2 changes from the left-inclined state to the right-inclined state. At the same time, the position of the contact part of the magnetic tape 2 with the magnetic head 3 varies in the upward direction in FIG. 2 and accompanying this position variation, the magnetic head 3 rotates in the D2 direction. Accompanying the rotation of the magnetic head 3, the top surface of the magnetic head 3 (contact surface with the magnetic tape 2) also changes from the left-inclined state to the right-inclined state.

According to the magnetic tape device 1a described above, in comparison to the magnetic tape device of FIG. 1, it is possible to suppress the amount of variation of the contact angle between the magnetic head 3 and the magnetic tape 2 and to further stabilize the operation of recording or reproducing a signal.

Figure 3:
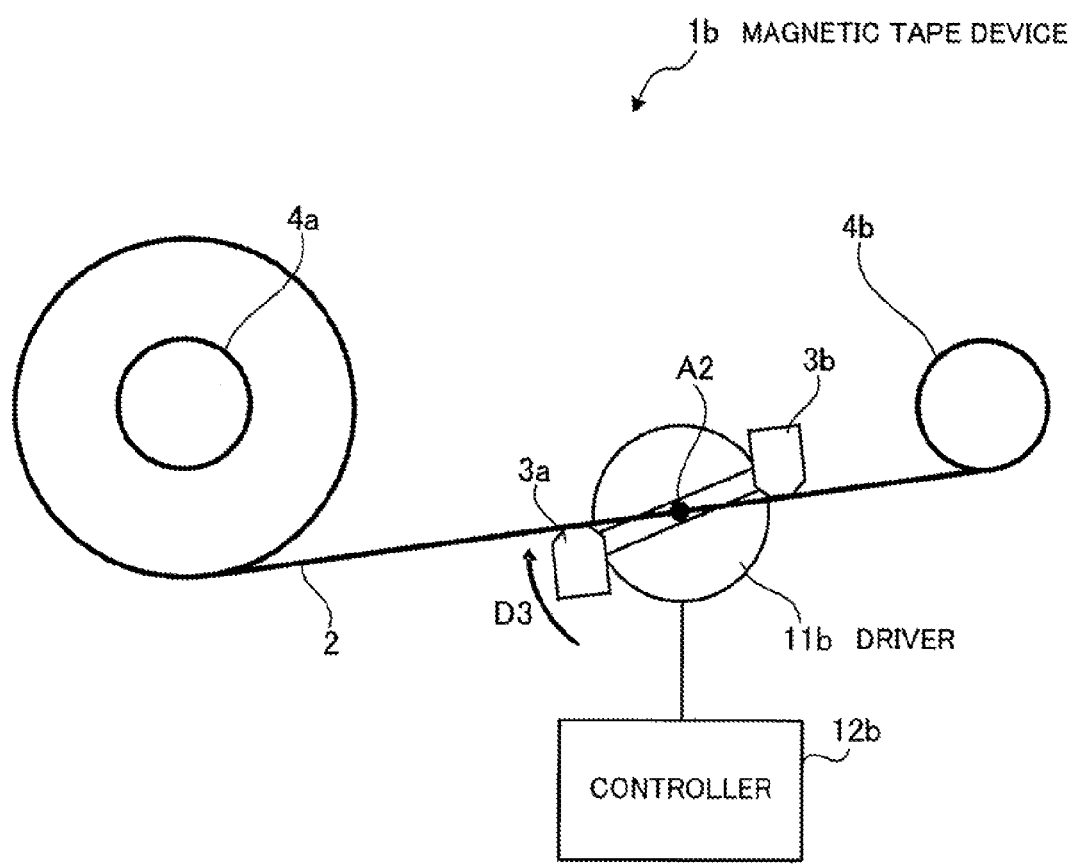
FIG. 3 illustrates a second modified example of the first embodiment.

FIG. 3 illustrates a second modified example of the first embodiment. Note that in FIG. 3, components corresponding to those of FIG. 1 are illustrated with the same symbols attached.

A magnetic tape device 1b illustrated in FIG. 3 is configured such that the magnetic tape device 1 illustrated in FIG. 1 includes magnetic heads 3a and 3b that contact each side of the magnetic tape 2, and the magnetic heads 3a and 3b are enabled to rotate about a rotation axis A2 parallel to the side of the magnetic tape 2 and perpendicular to the running direction of the magnetic tape 2. In addition, the magnetic heads 3a and 3b are provided in positions facing each other with respect to the rotation axis A2.

The magnetic tape device 1b includes a driver 11b configured to rotationally drive the magnetic heads 3a and 3b about the rotation axis A2 and a controller 12b configured to control the rotational driving operation by the driver 11b.

In the example of FIG. 3, the magnetic head 3a contacts the under side of the magnetic tape 2 and the magnetic head 3b contacts the upper side of the magnetic tape 2. The driver 11b causes the magnetic head 3a to contact the under side of the magnetic tape 2 and at the same time, causes the magnetic head 3b to contact the upper side of the magnetic tape 2 by rotating the magnetic heads 3a and 3b in the clockwise direction (D3 direction) in FIG. 3. Note that, the shape of the driver 11b illustrated in FIG. 3 is merely an example and it is possible to realize the driver 11b with an arbitrary outer shape and an internal configuration capable of generating the above-mentioned driving force.

The controller 12b causes the driver 11b to keep generating the rotational driving force in the D3 direction for pressing the magnetic heads 3a and 3b against the magnetic tape 2 while keeping the magnetic heads 3a and 3b in contact with the magnetic tape 2. The driving force that the driver 11b is caused to generate while the magnetic heads 3a and 3b are in contact with the magnetic tape 2 is a driving force with which the magnetic heads 3a and 3b remain still in the D3 direction with the state being kept where the magnetic heads 3a and 3b are pressed against each side of the magnetic tape 2 with a pressure not less than a predetermined value. In this state, the driving force in the D3 direction by the driver 11b and the reaction force in the opposite direction of D3 by the tension of the magnetic tape 2 are balanced.

The above-mentioned rotational driving force is generated from the driver 11b while the magnetic heads 3a and 3b are in contact with the magnetic tape 2, and thereby the magnetic heads 3a and 3b are pressed against the magnetic tape 2 with a pressure not less than a predetermined value even when the position of the portion of the magnetic tape 2 where the magnetic heads 3a and 3b contact the magnetic tape 2 varies in the vertical direction in FIG. 3 accompanying the running of the magnetic tape 2. Consequently, it is possible to suppress the amount of variation of pressure of the magnetic heads 3a and 3b against the magnetic tape 2 accompanying the variation of the running position of the magnetic tape 2, and therefore, it is possible to stabilize the operation of recording or reproducing a signal using both sides of the magnetic tape 2.

Further, as in the case of FIG. 2, also in the magnetic tape device 1b of FIG. 3, it is possible to cause the contact angle of the magnetic heads 3a and 3b relative to the magnetic tape 2 to follow the angular variation of the running path of the magnetic tape 2 to a certain degree by rotating the magnetic heads 3a and 3b about the rotation axis A2. Consequently, it is possible to suppress the amount of variation of the contact angle between the magnetic heads 3a and 3b and the magnetic tape 2 and to further stabilize the operation of recording or reproducing a signal using both sides of the magnetic tape 2.

Additionally, by the configuration in which the magnetic heads 3a and 3b are provided in the positions facing each other with respect to the rotation axis A2 as in FIG. 3, the following effect is also obtained. For example, there is a case where the running path of the magnetic tape 2 varies in the tape thickness direction due to the vibration of the magnetic tape 2 generated at the time of running of the magnetic tape 2. The position variation of the magnetic tape 2 due to the vibration at the time of running of the magnetic tape 2 may be minute but fast compared to the position variation of the magnetic tape 2 accompanying the change in the winding state of the magnetic tape 2 around the reel.

With the configuration in which only the magnetic head 3 contacts the magnetic tape 2 as in the example of FIG. 2, there is a case where it is not possible for the magnetic head 3 to follow the position variation of the magnetic tape 2 in the D2 direction due to the vibration at the time of running of the magnetic tape 2. In contrast to this, with the configuration of FIG. 3, when, for example, the magnetic tape 2 varies at high speed in the upward direction in FIG. 3 due to the vibration at the time of running of the magnetic tape 2, a pressure in the upward direction in FIG. 3 is applied to the magnetic head 3b from the magnetic tape 2. When such a pressure is applied, both the magnetic heads 3a and 3b are rotated in the opposite direction of D3 as a result. That is, even when the magnetic tape 2 varies at high speed in the direction in which the magnetic tape 2 becomes away from the magnetic head 3a, it is possible for the magnetic head 3a to maintain the state of being in contact with the magnetic tape 2, and therefore, to stably perform recording or reproducing a signal.

Note that, in the magnetic tape device 1b illustrated in FIG. 3, one of the magnetic heads 3a and 3b may be used as a mere contact member with no magnetic head for contacting the magnetic tape 2. Also in this case, it is possible to cause the magnetic head to follow the position variation of the magnetic tape 2 due to the vibration at the time of running of the magnetic tape 2 as described above.

Next, as a second embodiment, another configuration example of a magnetic tape device including two magnetic heads as illustrated in FIG. 3 is explained.

Second Embodiment

Figure 4:
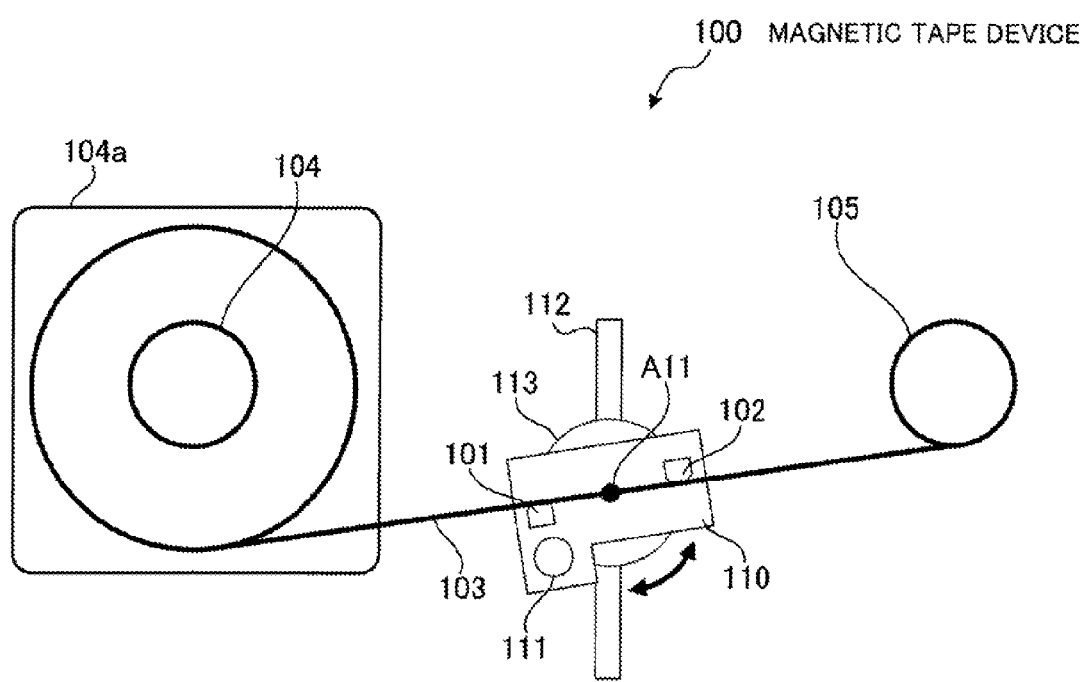
FIG. 4 illustrates a configuration example on the periphery of a magnetic tape in a magnetic tape device according to a second embodiment.

FIG. 4 illustrates a configuration example of the periphery of a magnetic tape in a magnetic tape device according to the second embodiment.

A magnetic tape device 100 includes two magnetic heads 101 and 102 and performs the operation of recording and reproducing using both sides of a magnetic tape 103 by the contact of the magnetic heads 101 and 102 with each side of the magnetic tape 103. In the example of FIG. 4, the magnetic head 101 contacts the side at the lower side of the magnetic tape 103 in FIG. 4 (hereinafter, simply referred to as the "under side") and writes and reads a signal. Moreover, the magnetic head 102 contacts the side at the upper side of the magnetic tape 103 in FIG. 4 (hereinafter, simply referred to as the "upper side") and writes and reads a signal.

Furthermore, in the magnetic tape device 100, the magnetic tape 103 is spanned directly between a reel 104 and a reel 105 and the magnetic heads 101 and 102 are arranged in the region between the reel 104 and the reel 105. That is, on the running path of the magnetic tape 103, there is nothing that contacts the magnetic tape 103 except the magnetic heads 101 and 102 and no guide roller is provided.

The reel 104 is rotationally driven by a file motor (not illustrated) that the magnetic tape device 100 includes and the reel 105 is rotationally driven by a machine motor (not illustrated) that the magnetic tape device 100 includes. In the present embodiment, the reel 104 is housed inside a tape cartridge 104a and the reel 105 is provided inside the magnetic tape device 100. It is possible to insert and extract the tape cartridge 104a into and from the magnetic tape device 100.

As will be described later, when the magnetic tape device 100 is loaded with the tape cartridge 104a, an end portion of the magnetic tape 103 wound around the reel 104 is pulled out of the tape cartridge 104a by an arm (not illustrated) that the magnetic tape device 100 includes. The magnetic tape 103 pulled out of the tape cartridge 104a is wound around the reel 105 on the magnetic tape device 100 side by the arm.

The magnetic heads 101 and 102 are provided on a head base 110. The head base 110 is made rotatable about a rotation axis A11 parallel to the tape surface of the magnetic tape 103 and perpendicular to the running direction of the magnetic tape 103. Further, the magnetic heads 101 and 102 are provided in positions facing each other with respect to the rotation axis A11 on the head base 110.

The head base 110 is rotationally driven by a head motor 111. When the operation of recording and reproducing is performed, the head motor 111 applies a rotational driving force to the head base 110 to rotate it in the clockwise direction in FIG. 4. Consequently, the magnetic head 101 is pressed and brought into contact with the under side of the magnetic tape 103 and the magnetic head 102 is pressed and brought into contact with the upper side of the magnetic tape 103. On the other hand, when pulling the magnetic tape 103 out of the tape cartridge 104a or when accommodating the whole of the magnetic tape 103 in the tape cartridge 104a, the head base 110 is rotated in the counterclockwise direction in FIG. 4 so that both the magnetic heads 101 and 102 become away from the magnetic tape 103.

Further, the head base 110 is made movable freely along a linear motion rail 112. The linear motion rail 112 is provided so as to extend in the direction in which the magnetic tape 103 intersects therewith in a plane including the running direction of the magnetic tape 103 and perpendicular to the tape surface of the magnetic tape 103. In the present embodiment, the linear motion rail 112 is provided so as to extend in the direction perpendicular to a straight line connecting the centers of the reels 104 and 105 in this plane (that is, in the vertical direction in FIG. 4). Due to this, the head base 110 is made movable freely in the vertical direction in FIG. 4. As will be described later, by using the configuration in which the head base 110 is movable freely in the vertical direction, the magnetic heads 101 and 102 are enabled to contact the magnetic tape 103 at an appropriate angle even when there occurs position variation of the magnetic tape 103 in accordance with the winding state of the magnetic tape 103 around the reel.

Note that, as will be described in detail in FIG. 5 and FIGS. 6A and 6B, the head base 110 is connected with the linear motion rail 112 via a gear 113.

Figure 5:
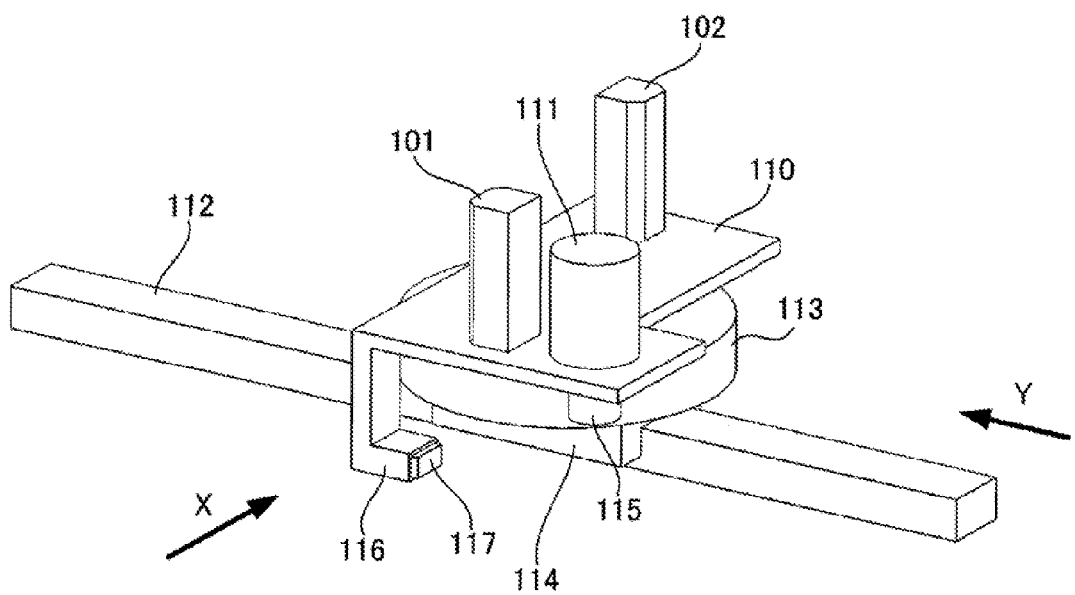
FIG. 5 is a perspective view illustrating a moving mechanism of a magnetic head.
Figure 6:
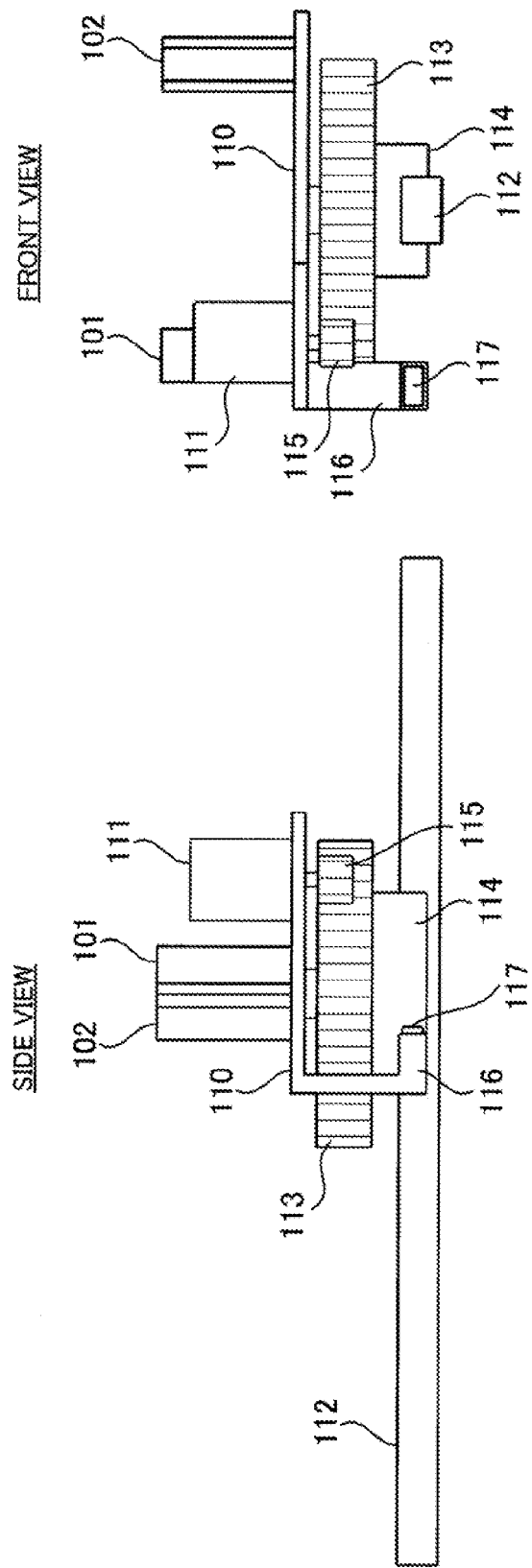
FIG. 6A is a side view illustrating the moving mechanism of the magnetic head and FIG. 6B is a front view illustrating the moving mechanism of the magnetic head.

FIG. 5 is a perspective view illustrating a moving mechanism of the magnetic head. Moreover, FIG. 6A is a side view illustrating the moving mechanism of the magnetic head and FIG. 6B is a front view illustrating the moving mechanism of the magnetic head. FIG. 6A is a diagram when viewed in an X-arrow direction in FIG. 5 and FIG. 6B is a diagram when viewed in a Y-arrow direction in FIG. 5.

The head base 110 is connected rotatably to the cylindrical gear 113. The rotation axis of the head base 110 coincides with the center of the outer diameter of the gear 113. To the gear 113, a linear motion bearing part 114 including a bearing (not illustrated) is fixed. The linear motion bearing part 114 is connected to the linear motion rail 112 via the bearing. Due to this, the gear 113 is made movable freely along the linear motion rail 112.

On the other hand, on the surface of the head base 110 opposite to the surface on which the magnetic heads 101 and 102 are placed, a cylindrical gear 115 rotated by the head motor 111 is provided. The gears 113 and 115 contact and engage with each other on the periphery thereof. Due to this, the head base 110 is made rotatable with the center of the outer diameter of the gear 113 as a rotation axis in accordance with the rotational driving of the head motor 111.

Further, on the surface of the head base 110 opposite to the surface on which the magnetic heads 101 and 102 are placed, a stopper 116 protrudes. To the end portion of the stopper 116, a stopper rubber 117 is fixed. The end portion of the stopper 116 contacts the linear motion rail 112 when the head base 110 rotates in the counterclockwise direction in FIG. 4 and the rotation angle of the head base 110 reaches a certain angle. The end portion of the stopper 116 contacts the linear motion rail 112, and thereby the rotation of the head base 110 in the counterclockwise direction in FIG. 4 is restricted. Note that, in the state where the end portion of the stopper 116 is in contact with the linear motion rail 112, the magnetic heads 101 and 102 are arranged so as to face each other in a direction substantially the same as the direction in which the linear motion rail 112 extends with the magnetic heads 101 and 102 away from the magnetic tape 103.

Moreover, as will be described later, in the state where the end portion of the stopper 116 is in contact with the linear motion rail 112, a rotation force in the counterclockwise direction in FIG. 4 is kept being given from the head motor 111 to the head base 110. Consequently, the head base 110 is fixed with respect to the linear motion rail 112 by a frictional force of the stopper rubber 117 and the head base 110 no longer moves in the direction in which the linear motion rail 112 extends.

Figure 7:
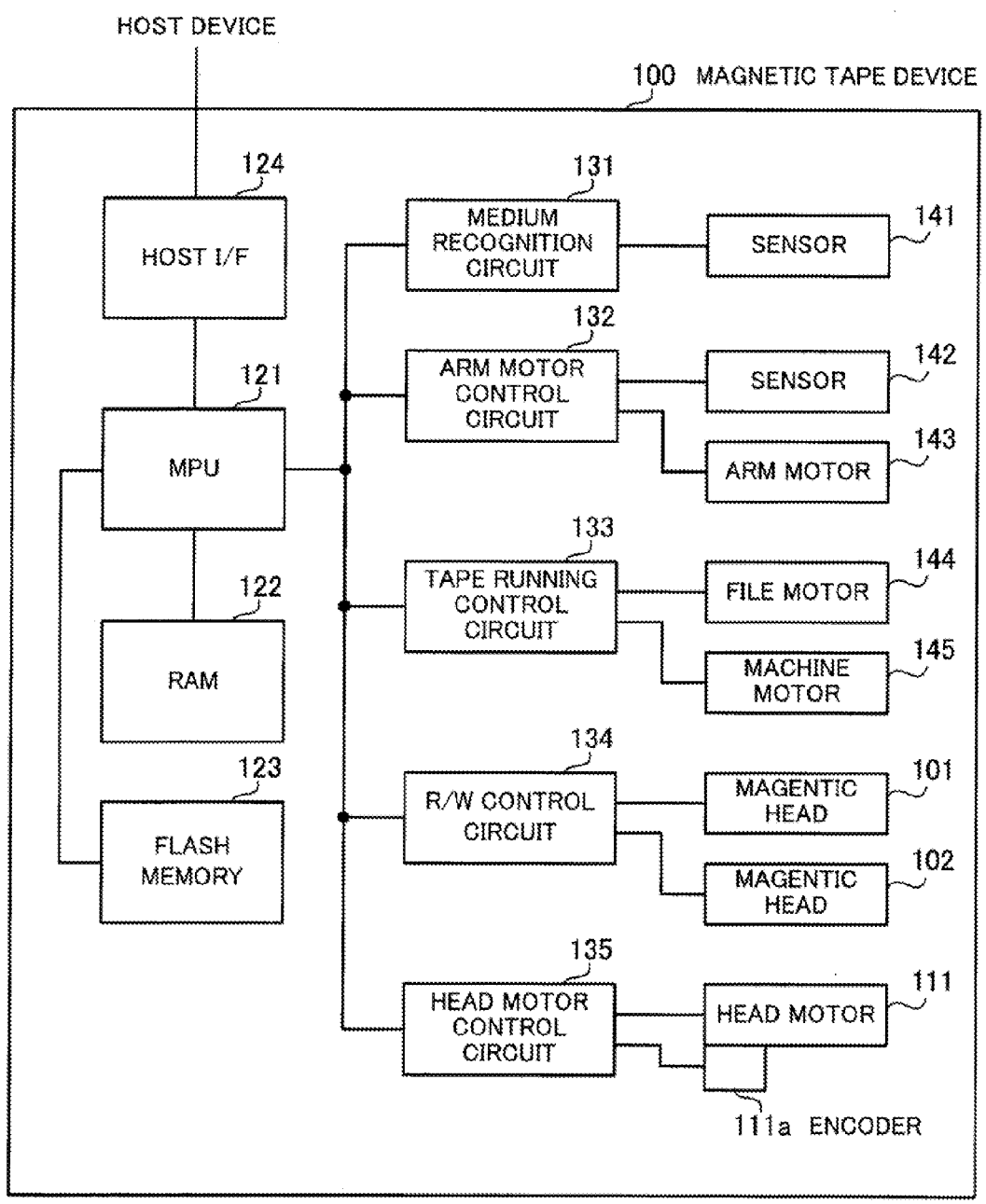
FIG. 7 illustrates a configuration example of a control system in the magnetic tape device according to the second embodiment.

Next, FIG. 7 illustrates a configuration example of a control system in the magnetic tape device according to the second embodiment.

The magnetic tape device 100 includes an MPU (Micro Processing Unit) 121, a RAM (Random Access Memory) 122, a flash memory 123, a host interface (I/F) 124, a medium recognition circuit 131, an arm motor control circuit 132, a tape running control circuit 133, an R/W (Read/Write) control circuit 134, a head motor control circuit 135, sensors 141 and 142, an arm motor 143, a file motor 144, a machine motor 145, the previously-described magnetic heads 101 and 102, and the previously-described head motor 111.

The MPU 121 makes use of the RAM 122 as a primary storage device and the flash memory 123 as a secondary storage device and totally controls the magnetic tape device 100 by executing programs stored in the flash memory 123. The RAM 122 temporarily stores at least part of the programs executed by the MPU 121 and various kinds of data necessary to execute the programs. The flash memory 123 stores programs executed by the MPU 121 and various kinds of data necessary to execute the programs. Note that, as the secondary storage device, in addition to the flash memory 123, for example, another kind of nonvolatile storage device, such as an HDD (Hard Disk), may be used.

The host interface 124 performs interface processing between the host device and the magnetic tape device 100. The host device, for example, instructs the magnetic tape device 100 to write data to the magnetic tape 103 and to read data from the magnetic tape.

The medium recognition circuit 131 determines whether the magnetic tape device 100 is loaded with the tape cartridge 104a in accordance with a detection signal from the sensor 141 and notifies the MPU 121 of the determination result.

The arm motor 143 drives the arm configured to pull the magnetic tape 103 out of the tape cartridge 104a and to house the whole of the magnetic tape 103 into the tape cartridge 104a. The arm motor control circuit 132 controls the operation of the arm by controlling the drive of the arm motor 143 while referring to the detection signal from the sensor 142 configured to detect the operation of the arm under the control of the MPU 121.

The file motor 144 rotationally drives the reel 104 on the tape cartridge 104a side. The machine motor 145 rotationally drives the reel 105 on the magnetic tape device 100 side. The tape running control circuit 133 controls the running operation of the magnetic tape 103 by controlling the drive of the file motor 144 and the machine motor 145 under the control of the MPU 121.

The R/W control circuit 134 controls the operation of writing and reading a signal using the magnetic heads 101 and 102 under the control of the MPU 121. The R/W control circuit 134 generates a write signal by giving an error correction code to the write data received from the MPU 121 and performing modulation thereof, and supplies the signal to one of the magnetic heads 101 and 102 to cause the one of the magnetic heads 101 and 102 to perform the write operation.

Further, the R/W control circuit 134 generates reproduced data by demodulating the signal read by one of the magnetic heads 101 and 102 and performing error correction processing thereof, and transmits the reproduced data to the MPU 121.

The head motor control circuit 135 controls the drive of the head motor 111 under the control of the MPU 121. Moreover, the head motor 111 includes an encoder 111a configured to output a pulse signal (tacho pulse) each time the head motor 111 rotates a predetermined angle. The MPU 121 is able to recognize the rotation speed and rotation angle of the head base 110 by receiving the tacho pulse from the encoder 111a through the head motor control circuit 135.

Figure 8:
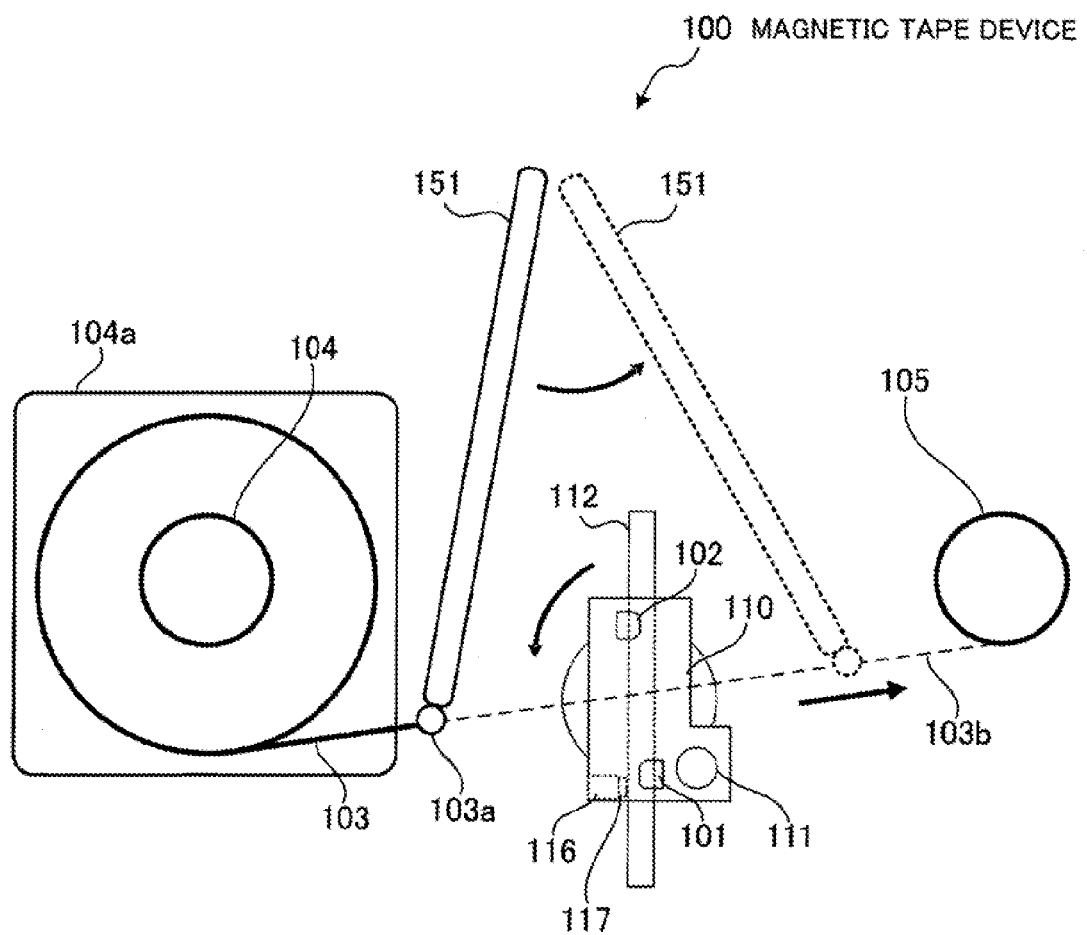
FIG. 8 illustrates the way a magnetic tape is wound around a reel on the magnetic tape device side.

Next, the procedure of operation of recording and reproducing a signal in the magnetic tape device 100 is explained in order. FIG. 8 illustrates the way of the operation of winding the magnetic tape around the reel on the magnetic tape device side.

When the magnetic tape device 100 is loaded with the tape cartridge 104a, the magnetic tape 103 is pulled out of the tape cartridge 104a by an arm 151 that the magnetic tape device 100 includes. The arm 151 operates by the drive of the arm motor 143. The arm 151 engages with a leader pin 103a provided at the end portion of the magnetic tape 103 accommodated in the tape cartridge 104a and moves the leader pin 103a along a leader pin path 103b indicated by a broken line in FIG. 8. Consequently, the magnetic tape 103 is pulled out of the tape cartridge 104a along the leader pin path 103b and wound around the reel 105 on the magnetic tape device 100 side.

Here, when the operation of winding the magnetic tape 103 is performed, the head base 110 comes to a stop in the state where the magnetic heads 101 and 102 are away from each other in the vertical direction in FIG. 8 (that is, in a direction substantially perpendicular to the running direction of the magnetic tape 103). At this time, under the control of the MPU 121, the head motor 111 keeps generating a torque to rotate the head base 110 in the counterclockwise direction in FIG. 8. Consequently, the stopper rubber 117 of the stopper 116 provided on the head base 110 contacts the left side surface of the linear motion rail 112 in FIG. 8 and the rotation of the head base 110 in the counterclockwise direction is restricted in the state where the magnetic heads 101 and 102 are away from each other substantially in the vertical direction. Along with this, the position of the head base 110 in the direction in which the linear motion rail 112 extends is fixed by the friction between the stopper rubber 117 and the linear motion rail 112.

By the above-mentioned operation by the head motor 111, the head base 110 stops with the magnetic heads 101 and 102 being away from each other substantially in the vertical direction. In such a state, the arm 151 is able to cause the leader pin 103a and the magnetic tape 103 to easily pass between the magnetic head 101 and the magnetic head 102.

Figure 9:
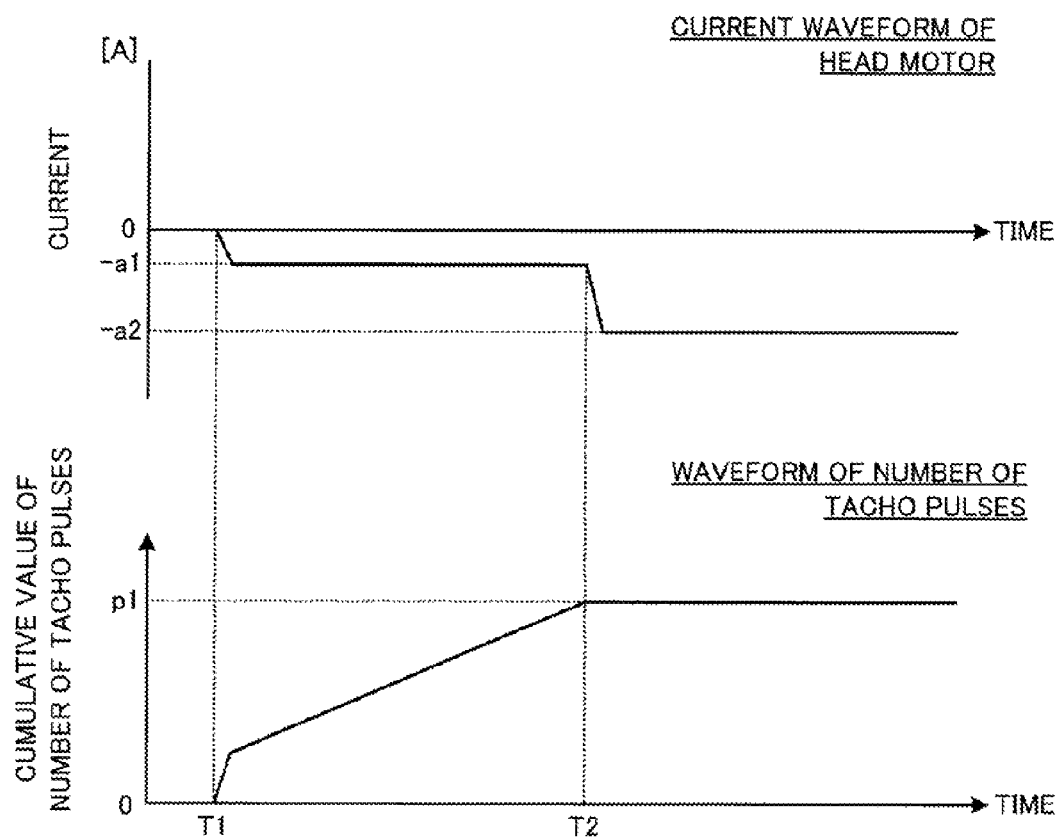
FIG. 9 is a graph illustrating a transition example of the control state of a head motor until the magnetic tape is wound.

Here, FIG. 9 is a graph illustrating a transition example of the control state of the head motor until the magnetic tape is wound.

Note that, the upper diagram of FIG. 9 illustrates transition of a drive current supplied from the head motor control circuit 135 to the head motor 111 under the control of the MPU 121. In FIG. 9, as an example, it is assumed that a negative current is supplied to the head motor 111 when the head base 110 is rotated in the counterclockwise direction in FIG. 8. Furthermore, the lower diagram of FIG. 9 illustrates a cumulative value of the number of tacho pulses output from the encoder 111a of the head motor 111. In the lower diagram of FIG. 9, it is assumed that the cumulative value of the number of tacho pulses in the initial state is "0".

At a timing T1, to the head motor 111, a current of −a1 (A) is supplied. Due to this, the head base 110 rotates counterclockwise in FIG. 8 and accompanying the rotation, the cumulative number of tacho pulses increases. Then, at a timing T2, the stopper rubber 117 of the stopper 116 provided on the head base 110 contacts the side surface of the linear motion rail 112.

The MPU 121 determines that the stopper rubber 117 has contacted the linear motion rail 112 by detecting that the reception of the tacho pulse is stopped at the timing T2. At this time, by the control of the MPU 121, to the head motor 111, a current of −a2 (A) (here, a1<a2) is supplied. Due to this, the pressure with which the stopper rubber 117 presses the linear motion rail 112 increases and the position of the head base 110 is reliably fixed in the direction in which the linear motion rail 112 extends. In this state, the operation of winding the magnetic tape 103 around the reel 105 by the arm 151 is performed.

Figure 10:
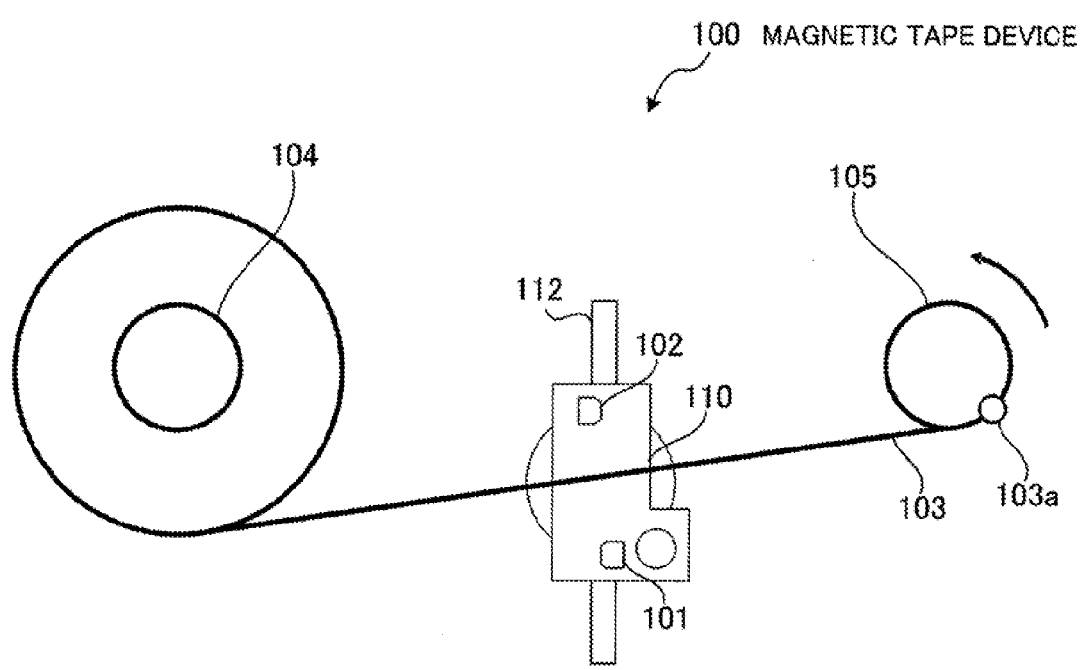
FIG. 10 illustrates a state where one end of the magnetic tape is wound around the reel on the magnetic tape device side.

Next, FIG. 10 illustrates the state where one end of the magnetic tape is wound around the reel on the magnetic tape device side. Moreover, FIG. 11 illustrates the state where a tension is applied to the magnetic tape.

The magnetic tape 103 is wound around the reel 105 when the leader pin 103a is attached to the reel 105 on the magnetic tape device 100 side by the operation of the arm 151 (see FIG. 8), and further when the reel 105 is rotated in the counterclockwise direction in FIG. 10 as illustrated in FIG. 10. When a predetermined length of the magnetic tape 103 is wound around the reel 105, the rotation of the reel 105 is stopped.

Figure 11:
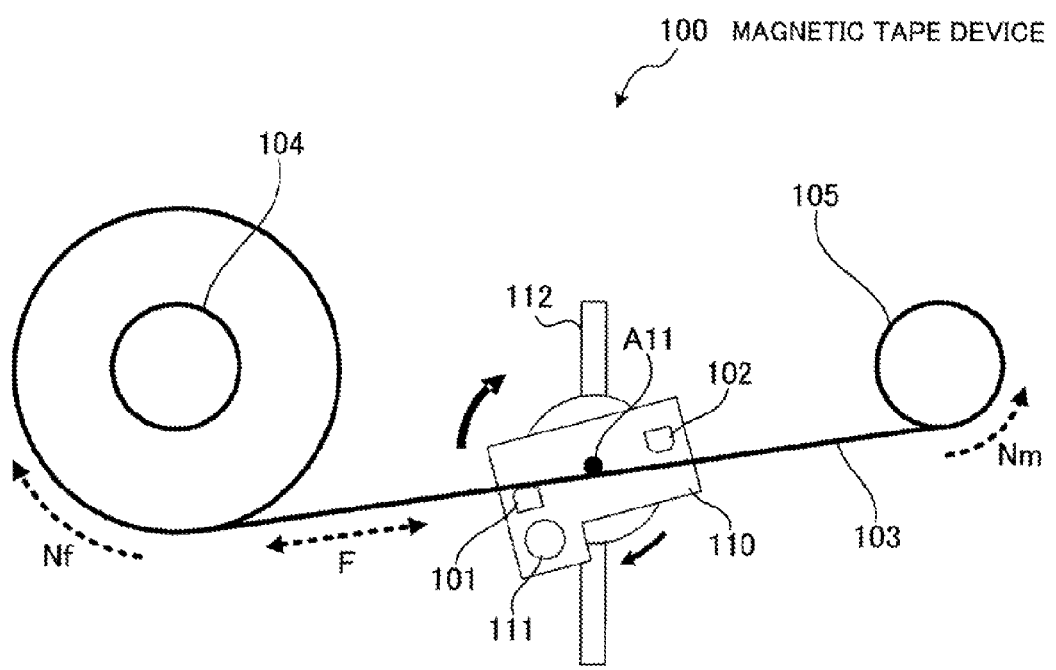
FIG. 11 illustrates a state where a tension is applied to the magnetic tape.

In this state, as illustrated in FIG. 11, a motor torque Nf in the clockwise direction in FIG. 11 is applied to the reel 104 on the tape cartridge 104a side and at the same time, a motor torque Nm (=Nf) in the counterclockwise direction in FIG. 11 is applied to the reel 105 on the magnetic tape device 100 side. Consequently, a constant tension F (=Nf+Nm) is applied to the magnetic tape 103.

In the state where the tension F is applied to the magnetic tape 103, the head motor 111 is driven and the head base 110 is rotated in the clockwise direction in FIG. 11. Here, as in FIG. 11, when the running position of the magnetic tape 103 is not on the rotation axis A11 of the head base 110, one of the magnetic heads 101 and 102 contacts the magnetic tape 103 and after that, the other contacts the magnetic tape 103. In the example of FIG. 11, when the head base 110 is rotated, first, the magnetic head 101 contacts the under side of the magnetic tape 103. Note that, accompanying the rotation in the clockwise direction, the head base 110 is brought into the state of capable of moving freely in the direction in which the linear motion rail 112 extends.

Figure 12:
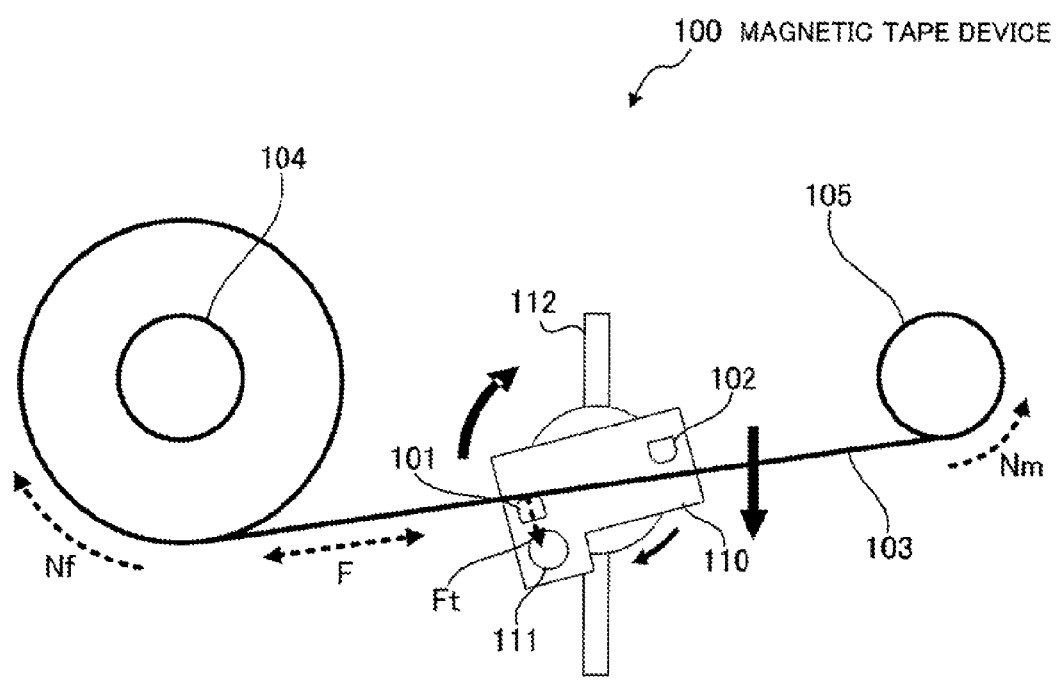
FIG. 12 illustrates a state where one of the magnetic heads contacts the magnetic tape.

FIG. 12 illustrates the state where one of the magnetic heads is in contact with the magnetic tape.

When the magnetic head 101 contacts the under side of the magnetic tape 103 accompanying the rotation of the head base 110 in the clockwise direction, a reaction force Ft by the tension F of the magnetic tape 103 is applied from the magnetic tape 103 to the magnetic head 101. By the reaction force Ft, the movement of the magnetic head 101 is restricted, but the head motor 111 keeps rotationally driving the head base 110. At this time, the head base 110 begins to move in the downward direction in FIG. 12 along the linear motion rail 112 by the motor torque from the head motor 111 because the head base 110 is in the state of being movable freely in the direction in which the linear motion rail 112 extends. Further, accompanying the movement of the head base 110 in the downward direction, the head base 110 further rotates in the clockwise direction. After that, the other magnetic head 102 contacts the upper side of the magnetic tape 103.

Figure 13:
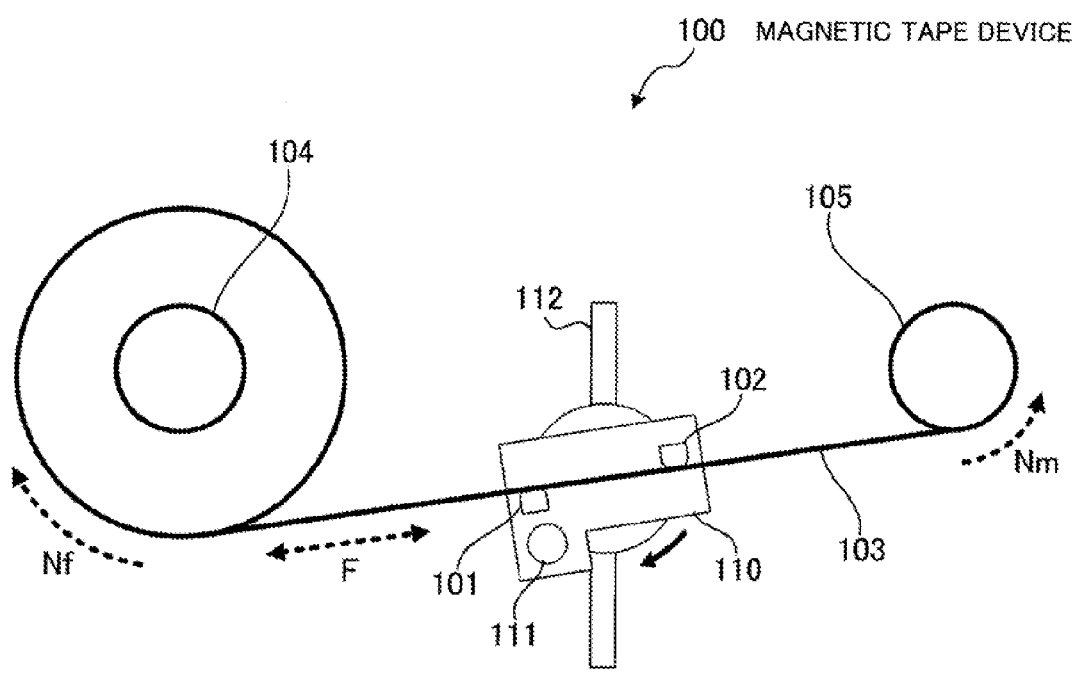
FIG. 13 illustrates a state where both the magnetic heads contact the magnetic tape.

FIG. 13 illustrates the state where both the magnetic heads are in contact with the magnetic tape.

After both the magnetic heads 101 and 102 contact the magnetic tape 103, when the pressing force of the magnetic head 101 against the under side of the magnetic tape 103 and the pressing force of the magnetic head 102 against the upper side of the magnetic tape 103 coincide with each other, a state is brought about where the respective pressing forces of the magnetic heads 101 and 102 and the reaction force of the magnetic tape 103 by the tension F are balanced. Due to this, the rotation and the movement in the downward direction of the head base 110 are stopped.

In this state, the head motor 111 generates a constant motor torque and by the motor torque, the magnetic heads 101 and 102 are pressed against the magnetic tape 103 with an equal pressure, respectively. Then, with this state being kept, the winding of the magnetic tape 103 around the reel 105 on the magnetic tape device 100 side is started and the operation of recording or reproducing a signal by the magnetic heads 101 and 102 is started.

Figure 14:
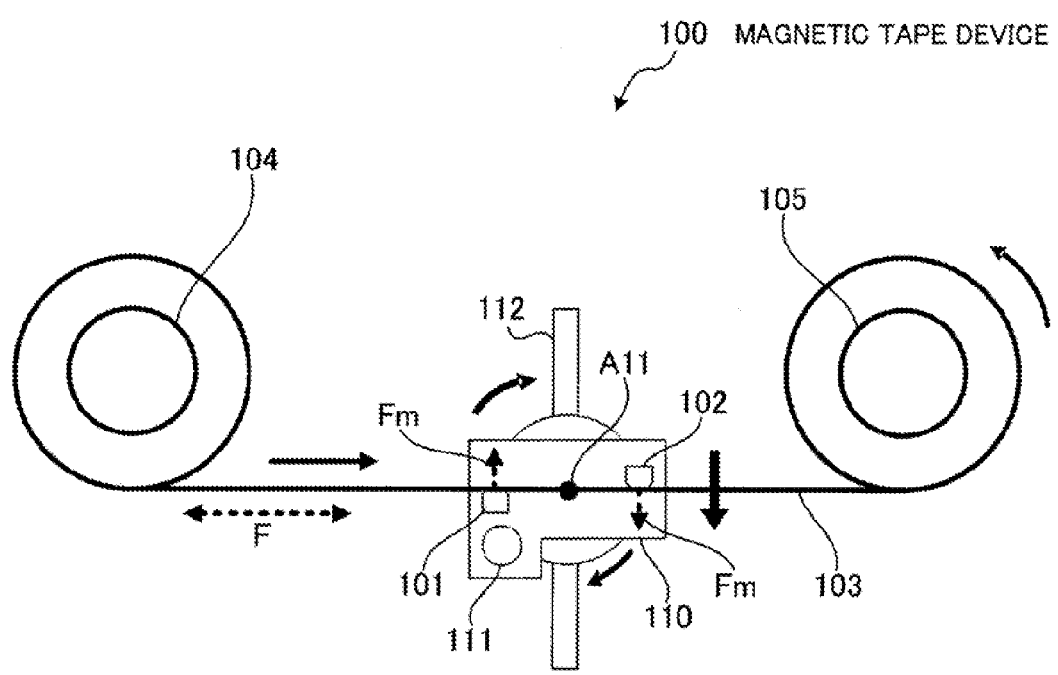
FIG. 14 illustrates an example of a state during the operation of recording or reproducing a signal.

FIG. 14 illustrates an example of the state during the operation of recording or reproducing a signal.

As the magnetic tape 103 is wound around the reel 105, the angle of the running path of the magnetic tape 103 changes from the left-inclined state to the right-inclined state in FIG. 14. Further, when the rotation axis A11 of the head base 110 is shifted from the middle position between the centers of rotation of the reels 104 and 105, the positions where the magnetic heads 101 and 102 contact the magnetic tape 103 also vary in the vertical direction.

Here, while the magnetic tape 103 is wound around the reel 105, by the drive of the file motor 144 and the machine motor 145 configured to rotationally drive the reels 104 and 105, the constant tension F is applied to the magnetic tape 103. On the other hand, the head motor 111 keeps generating a constant motor torque, and thereby the magnetic heads 101 and 102 are pressed against the magnetic tape 103 with an equal pressure Fm, respectively. A state is brought about where the pressure Fm applied to the magnetic tape 103 by the magnetic heads 101 and 102 and the reaction force by the tension F of the magnetic tape 103 are balanced.

Because of these conditions, the head base 110 rotates in the clockwise direction accompanying the variation of the running angle of the magnetic tape 103. At the same time, the head base 110 moves along the linear motion rail 112 accompanying the variation in the vertical direction of the running path of the magnetic tape 103. As in the example of FIG. 14, when the rotation axis A11 of the head base 110 exists on the right side of the middle position between the centers of rotation of the reels 104 and 105, the head base 110 moves in the downward direction along the linear motion rail 112.

Figure 15:
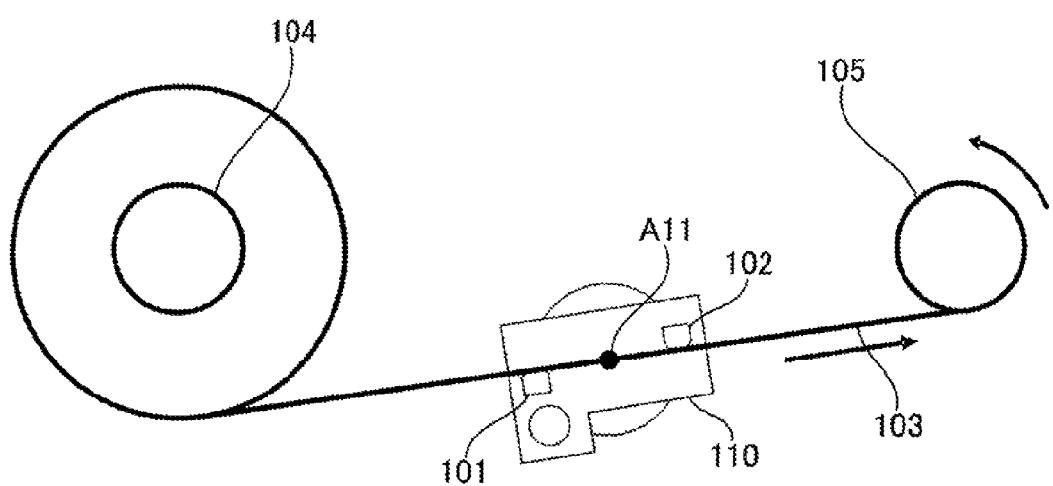
FIG. 15 illustrates an example (part 1) of a state during the operation of recording or reproducing a signal in a comparative example.
Figure 16:
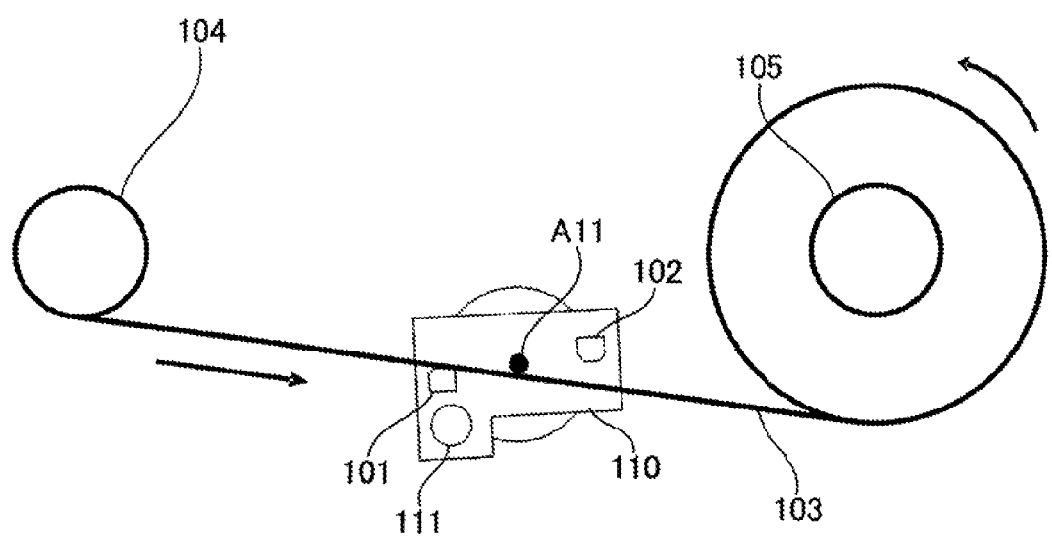
FIG. 16 illustrates the example (part 2) of the state during the operation of recording or reproducing a signal in the comparative example.

Here, the relationship between the magnetic heads 101 and 102 and the magnetic tape 103 when it is assumed that the head base 110 does not move in the direction in which the linear motion rail 112 extends is explained as a comparative example. FIGS. 15 and 16 illustrate an example of the state during the operation of recording or reproducing a signal in the comparative example.

As illustrated in FIG. 15, it is assumed that the contact angle of the magnetic heads 101 and 102 relative to the magnetic tape 103 is 90°, respectively, at the time of start of winding of the magnetic tape 103 around the reel 105. At this time, the rotation axis A11 of the head base 110 exists in the width direction of the magnetic tape 103.

However, as the winding of the magnetic tape 103 around the reel 105 advances, the position where the magnetic heads 101 and 102 contact the magnetic tape 103 varies in the downward direction. By such position variation of the magnetic tape 103, a state is brought about where only the magnetic head 101, which is one of the magnetic heads 101 and 102, is in contact with the magnetic tape 103 as illustrated in FIG. 16. Further, the contact angle of the magnetic head 101 relative to the magnetic tape 103 is also no longer 90°.

Further, it is possible to cause both the magnetic heads 101 and 102 to contact the magnetic tape 103 by increasing the motor torque of the head motor 111. However, in this case, the respective pressing forces of the magnetic heads 101 and 102 against the magnetic tape 103 become not equal to each other, and therefore, there is a possibility that the operation of recording and reproducing a signal is not stable. As in the example of FIG. 16, when the rotation axis A11 of the head base 110 is located on the upper side of the running path of the magnetic tape 103, the pressing force of the magnetic head 101 against the magnetic tape 103 becomes larger than the pressing force of the magnetic head 102 against the magnetic tape 103. In this case, there is also such a problem that a large burden is imposed on the magnetic tape 103 by the large pressing force exerted on the magnetic tape 103 by the magnetic head 101.

In contrast to this, as illustrated in FIGS. 13 and 14, by making the head base 110 movable freely in the direction in which the linear motion rail 112 extends, it is possible to cause both the magnetic heads 101 and 102 to contact the magnetic tape 103 with an equal pressure. Further, it is possible to keep the contact angle of the magnetic heads 101 and 102 relative to the magnetic tape 103 substantially constant at 90°. Consequently, it is possible to stabilize the operation of recording and reproducing a signal by the magnetic heads 101 and 102.

Figure 17:
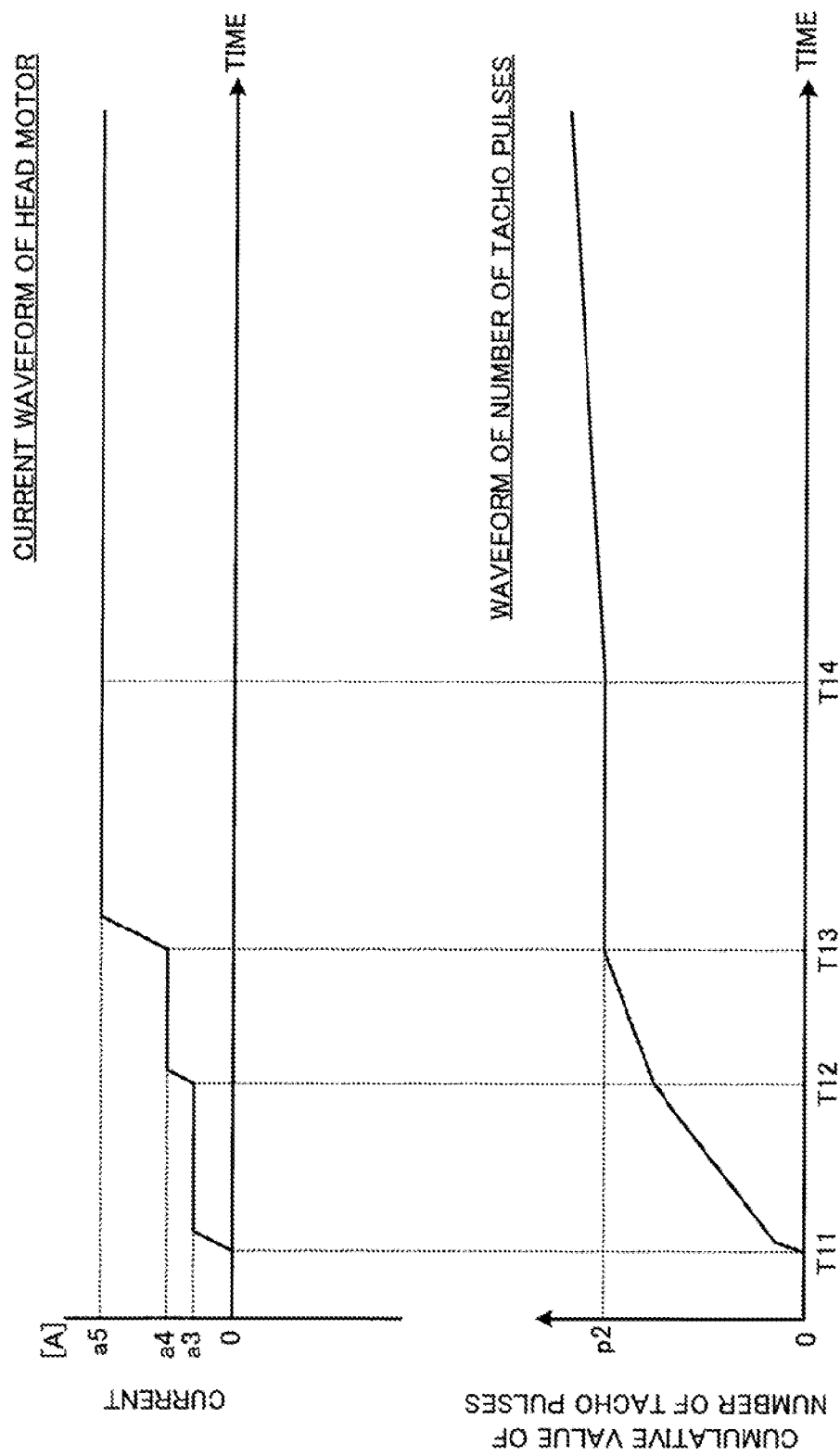
FIG. 17 is a graph illustrating a transition example of the control state of the head motor until a signal is recorded or reproduced.

FIG. 17 is a graph illustrating an example of transition of the control state of the head motor until recording or reproducing a signal is performed.

Note that, as in FIG. 9, the upper diagram of FIG. 17 illustrates transition of a drive current supplied from the head motor control circuit 135 to the head motor 111 under the control of the MPU 121. Moreover, the lower diagram of FIG. 17 illustrates the cumulative value of the number of tacho pulses output from the encoder 111a of the head motor 111. In the lower diagram of FIG. 17, it is assumed that the cumulative value of the number of tacho pulses in the initial state is "0". The initial state in FIG. 17 is a state where the position of the head base 110 in the direction in which the linear motion rail 112 extends is fixed as in FIG. 10 and the tension F is applied to the magnetic tape 103.

At a timing T11, to the head motor 111, a current of a3 (A) is supplied. Due to this, the head base 110 rotates in the clockwise direction in FIGS. 10 to 16. At a timing T12, the MPU 121 detects a change in the reception interval of the tacho pulse and determines that the magnetic head 101, which is one of the magnetic heads 101 and 102, has contacted the magnetic tape 103. The MPU 121 causes a current of a4 (A), larger than a3 (A), to be supplied to the head motor 111. Consequently, as illustrated in FIG. 12, the head base 110 moves in the downward direction and at the same time, further rotates in the clockwise direction.

Note that, it is possible to reliably cause the head base 110 to move in the direction along the linear motion rail 112 by increasing the current to be supplied to the head motor 111 to a4 (A) to increase the motor torque. However, as another example, it may also be possible to supply the current of a4 (A) to the head motor 111 from the stage at the timing T11.

However, by suppressing the current to be supplied to the head motor 111 in the state at the timing T11 to a3 (A), it is possible to suppress the impact when the magnetic head 101, which is one of the magnetic heads 101 and 102, contacts the magnetic tape 103.

At a timing T13, the MPU 121 determines that both the magnetic heads 101 and 102 have contacted the magnetic tape 103 by detecting that the reception of the tacho pulse is stopped. The MPU 121 causes a current of a5 (A), larger than a4 (A), to be supplied to the head motor 111. Due to this, the pressure with which the magnetic heads 101 and 102 press the magnetic tape 103 is raised to a pressure equal to or higher than a constant pressure appropriate when recording and reproducing a signal.

Note that, as another example, it may also be possible to supply the current of a5 (A) to the head motor 111 from the stage at the timing T12 or timing T11. However, by keeping the current to be supplied to the head motor 111 lower than a5 (A) before the timing T13, it is possible to suppress the impact when the magnetic head contacts the magnetic tape 103.

After this, the winding of the magnetic tape 103 around the reel 105 is started at a timing T14 and the operation of recording or reproducing a signal is started. During the operation of recording and reproducing a signal also, the constant current of a5 (A) is continuously supplied to the head motor 111 and a constant motor torque is given to the head base 110. At this time, the head base 110 is made movable freely in the vertical direction in FIG. 14, and therefore, the magnetic heads 101 and 102 press the magnetic tape 103 with an equal pressure, respectively.

Moreover, as explained in FIG. 14, as the winding of the magnetic tape 103 around the reel 105 advances and the angle of the running path of the magnetic tape 103 varies, the head base 110 also rotates further in the clockwise direction in FIG. 14. Accompanying the rotation of the head base 110, after the timing T14, the cumulative value of the number of tacho pulses increases gradually.

Next, the processing procedure in the magnetic tape device 100 is explained using a flowchart.

FIG. 18 is a flowchart illustrating an example of the processing procedure in the magnetic tape device. The processing of FIG. 18 is started when the medium recognition circuit 131 detects that the magnetic tape device 100 is loaded with the tape cartridge 104a based on the detection result of the sensor 141 and notifies the MPU 121 of that.

(Step S11) The MPU 121 instructs the head motor control circuit 135 to supply the current of −a1 (A) to the head motor 111. In response to this instruction, the current of −a1 (A) is supplied to the head motor 111 and the head base 110 rotates in the direction in which the magnetic heads 101 and 102 become away from the magnetic tape 103 (in the counter-clockwise direction of FIG. 8).

(Step S12) The MPU 121 determines whether or not the rotation of the head base 110 has stopped. The MPU 121 receives the tacho pulse output from the encoder 111a through the head motor control circuit 135. When the reception of the tacho pulse has stopped, the MPU 121 determines that the rotation of the head base 110 has stopped (S12: Yes) and performs processing of step S13. In the state where the rotation of the head base 110 is stopped, a state is brought about where the stopper rubber 117 of the stopper 116 provided on the head base 110 is in contact with the side surface of the linear motion rail 112.

(Step S13) The MPU 121 instructs the head motor control circuit 135 to supply the current of −2a (A) (a1<a2) to the head motor 111. In response to this instruction, the current of −a2 (A) is supplied to the head motor 111 and the stopper rubber 117 is pressed against the side surface of the linear motion rail 112 with a higher pressure.

(Step S14) The MPU 121 instructs the arm motor control circuit 132 to pull the magnetic tape 103 out of the tape cartridge 104a and to wind the magnetic tape 103 around the reel 105 on the magnetic tape device 100 side. The arm motor control circuit 132 drives the arm motor 143 in response to the instruction from the MPU 121. Accompanying the drive of the arm motor 143, the arm 151 engages with the leader pin 103a of the magnetic tape 103, causes the leader pin 103a to move along the leader pin path, and attaches the leader pin 103a to the reel 105 on the magnetic tape device 100 side.

(Step S15) The MPU 121 instructs the tape running control circuit 133 to apply a constant tension to the magnetic tape 103. In response to the instruction from the MPU 121, the tape running control circuit 133 causes the file motor 144 and the machine motor 145 to generate a motor torque to rotate each of the reels 104 and 105 in the direction in which the magnetic tape 103 is wound. Due to this, the tension F is applied to the magnetic tape 103.

(Step S16) The MPU 121 instructs the head motor control circuit 135 to supply the current of a3 (A) to the head motor 111. In response to this instruction, the current of a3 (A) is supplied to the head motor 111 and the head base 110 rotates in the direction in which the magnetic heads 101 and 102 come close to the magnetic tape 103 (in the clockwise direction of FIG. 11).

(Step S17) The MPU 121 determines whether or not one of the magnetic heads 101 and 102 has contacted the magnetic tape 103. When detecting that the reception interval of the tacho pulse from the encoder 111a is lengthened, the MPU 121 determines that one of the magnetic heads 101 and 102 has contacted the magnetic tape 103 (S17: Yes) and performs the processing of step S18.

(Step S18) The MPU 121 instructs the head motor control circuit 135 to supply the current of a4 (A) (a3<a4) to the head motor 111. In response to this instruction, the current of a4 (A) is supplied to the head motor 111 and the head base 110 further rotates in the same direction as that of step S16 (in the clockwise direction of FIG. 11).

(Step S19) The MPU 121 determines whether or not the other of the magnetic heads 101 and 102 has contacted the magnetic tape 103. When detecting that the reception of the tacho pulse from the encoder 111a has stopped, the MPU 121 determines that the other of the magnetic heads 101 and 102 has contacted the magnetic tape 103 (S19: Yes) and performs the processing of step S20.

(Step S20) The MPU 121 instructs the head motor control circuit 135 to supply the current of a5 (A) (a4<a5) to the head motor 111. In response to this instruction, the current of a5 (A) is supplied to the head motor 111 and the magnetic heads 101 and 102 are pressed against the magnetic tape 103 with a pressure equal to or higher than a constant pressure appropriate when recording and reproducing a signal.

(Step S21) The MPU 121 determines whether or not to start recording or reproducing a signal. For example, upon receipt of an operation input to instruct to start the operation of recording or reproducing a signal (S21: Yes), the MPU 121 performs the processing of step S22.

(Step S22) The MPU 121 instructs the tape running control circuit 133 to start running the magnetic tape 103. In response to the instruction from the MPU 121, the tape running control circuit 133 drives the file motor 144 and the machine motor 145 so that the magnetic tape 103 is wound around the reel 105 with the state being kept where the constant tension F is applied to the magnetic tape 103. At this time, the current of a5 (A) is continuously supplied to the head motor 111 and the state is maintained where the magnetic heads 101 and 102 are pressed against the magnetic tape 103 with a constant pressure.

Note that, when the magnetic tape 103 is wound around the reel 104 on the tape cartridge 104a side also, the current of a5 (A) is supplied to the head motor 111 and the state is kept where the magnetic heads 101 and 102 are in contact with the magnetic tape 103. The MPU 121 receives positional information recorded in the magnetic tape 103 through the R/W control circuit 134. When detecting that the magnetic tape 103 is wound up to a predetermined position close to the end portion based on the received positional information, the MPU 121 performs the same processing as that of steps S11 to S13 after stopping the running of the magnetic tape 103. Consequently, in the state where the magnetic heads 101 and 102 are away from the magnetic tape 103, the rotation of the head base 110 is stopped and at the same time, the position of the head base 110 is fixed.

In this state, the MPU 121 drives the arm motor 143, causes the leader pin 103a of the magnetic tape 103 to engage with the arm 151, and moves the leader pin 103a in the direction of the tape cartridge 104a. By the operation of the arm 151, the leader pin 103a moves to the side of the tape cartridge 104a through the space between the magnetic heads 101 and 102.

The second embodiment explained as above is configured such that the head base 110 is made movable freely in the direction in which the linear motion rail 112 extends while the motor torque is continuously given to the head base 110 so that the magnetic heads 101 and 102 are pressed against the magnetic tape 103. With such a configuration, even when the running position of the magnetic tape 103 varies in accordance with the winding state of the magnetic tape 103 around the reel, it is possible to keep constant the pressure of the magnetic heads 101 and 102 against the magnetic tape 103 and keep constant the contact angle of the magnetic heads 101 and 102 relative to the magnetic tape 103. Consequently, it is made possible to stably perform the operation of recording and reproducing a signal.

Moreover, according to the second embodiment, it is also possible to increase the degree of freedom of the position of the head base 110. In particular, as in the second embodiment described above, when the tape cartridge 104a in which only the one reel 104 is accommodated is used, if an attempt is made to downsize the magnetic tape device 100, the possibility is enhanced that it is not possible to arrange the rotation axis of the head base 110 in a position equidistant from the rotation axes of the reels 104 and 105. Specifically, the possibility is enhanced that it is necessary to shift the position of the head base 110 to the reel 105 side. In the second embodiment, even in such a case, it is possible to stabilize the operation of recording and reproducing a signal.

Note that, in the second embodiment described above, the magnetic tape device 100 is illustrated that uses the tape cartridge 104a in which the one reel 104 is accommodated, but, it is also possible to modify the configuration into a configuration in which, for example, a tape cartridge in which the two reels 104 and 105 are accommodated is loaded or a configuration in which the two reels 104 and 105 are attached directly to the magnetic tape device without using a tape cartridge, etc.

Further, in the second embodiment, the head base 110 is made movable freely in the vertical direction in FIGS. 10 to 14. However, the direction in which the head base 110 is made movable freely is not limited to this direction and another direction may be accepted as long as the head base 110 intersects with the magnetic tape in a plane including the running direction of the magnetic tape 103 and perpendicular to the side of the magnetic tape 103.

Furthermore, in the second embodiment described above, the head base 110 is enabled to rotate by the driving force of the head motor 111. However, for example, such a configuration may be accepted in which it is not possible for the head base 110 to rotate with the state being kept where the magnetic heads 101 and 102 are along the running direction of the magnetic tape 103. In this case, the head base 110 moves along the linear motion rail 112 following the position variation of the magnetic tape 103 in accordance with the winding state of the magnetic tape 103 around the reel. Because of this, the effect of suppressing the pressure variation of the magnetic heads 101 and 102 against the magnetic tape 103 is obtained.

According to an aspect, it is possible to stabilize the operation of recording or reproducing a signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A magnetic tape device comprising:
a magnetic head arranged between two reels around which a magnetic tape is wound and configured to contact one side of the magnetic tape spanned between the two reels, the magnetic head being rotatable about a rotation axis parallel to a tape surface of the magnetic tape and perpendicular to a running direction of the magnetic tape;
a contact member arranged between the two reels and configured to contact the other side of the magnetic tape;
a base member rotatable about the rotation axis and provided in a position where the magnetic head and the contact member face each other with respect to the rotation axis, the base member being configured to move freely in a direction in which the base member intersects with the magnetic tape in a plane including the running direction of the magnetic tape and perpendicular to the tape surface of the magnetic tape in a state of being capable of receiving a rotational driving force from the driver;
a driver configured to rotationally drive the base member and the magnetic head about the rotation axis so as to move and press the magnetic head against the one side of the magnetic tape; and
a controller configured to cause the driver to generate a driving force for pressing the magnetic head against the one side of the magnetic tape and at the same time, for pressing the contact member against the other side of the magnetic tape, while keeping the magnetic head and the contact member in contact with the magnetic tape.

2. The magnetic tape device according to claim 1, wherein the controller is able to retreat the magnetic head and the contact member from the magnetic tape by rotating the base member in a second rotation direction opposite to a first rotation direction for pressing the magnetic head and the contact member against the magnetic tape, and wherein when the base member is rotated in the second rotation direction to reach a predetermined rotating state, the movement of the base member is restricted in the direction in which the base member intersects with the magnetic tape in a plane including the running direction of the magnetic tape and perpendicular to the tape surface of the magnetic tape with a state being kept where the magnetic head and the contact member are away from the magnetic tape.

3. The magnetic tape device according to claim 2, wherein the base member includes a second contact part configured to restrict the rotation of the base member in the second rotation direction in the state where the magnetic head and the contact member are away from the magnetic tape by coming into contact with a first contact part provided in the magnetic tape device, and wherein the controller restricts the movement of the base member in the direction in which the base member intersects with the magnetic tape in a plane including the running direction of the magnetic tape and perpendicular to the tape surface of the magnetic tape by causing the driver to generate a rotational driving force in the second rotation direction for pressing the second contact part against the first contact part.

4. The magnetic tape device according to claim 1, wherein a magnetic head is also provided on a contact surface with respect to the other side of the magnetic tape in the contact member.

5. A method for controlling movement of a magnetic head in a magnetic tape device including
   a magnetic head arranged between two reels around which a magnetic tape is wound and configured to contact one side of the magnetic tape spanned between the two reels, the magnetic head being rotatable about a rotation axis parallel to a tape surface of the magnetic tape and perpendicular to a running direction of the magnetic tape,
   a contact member arranged between the two reels and configured to contact the other side of the magnetic tape,
   a base member rotatable about the rotation axis and at the same time, provided in a position where the magnetic head and the contact member face each other with respect to the rotation axis, and
   a driver configured to move the magnetic head,
the method comprising:
   allowing the base member to move freely in a direction in which the base member intersects with the magnetic tape in a plane including the running direction of the magnetic tape and perpendicular to the tape surface of the magnetic tape;
   causing the driver to generate a rotational driving force for pressing the magnetic head against the one side of the magnetic tape and at the same time, for pressing the contact member against the other side of the magnetic tape with a state being kept where the base member moves freely, while keeping the magnetic head and the contact member in contact with the magnetic tape.

6. The method for controlling movement of a magnetic head according to claim 5, wherein
   the base member includes a second contact part configured to restrict the rotation of the base member in a second rotation direction opposite to a first rotation direction for pressing the magnetic head and the contact member against the magnetic tape in a state where the magnetic head and the contact member are away from the magnetic tape by coming into contact with a first contact part provided in the magnetic tape device, and wherein
   the method further includes processing to restrict the movement of the base member in the direction in which the base member intersects with the magnetic tape in a plane including the running direction of the magnetic tape and perpendicular to the tape surface of the magnetic tape by causing the driver to generate a rotational driving force in the second rotation direction for pressing the second contact part against the first contact part.

* * * * *